(12) United States Patent
Nayar et al.

(10) Patent No.: US 7,149,262 B1
(45) Date of Patent: Dec. 12, 2006

(54) METHOD AND APPARATUS FOR ENHANCING DATA RESOLUTION

(75) Inventors: Shree K. Nayar, New York, NY (US); Srinivasa G. Narasimhan, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 282 days.

(21) Appl. No.: 10/312,529

(22) PCT Filed: Jul. 6, 2001

(86) PCT No.: PCT/US01/21311

§ 371 (c)(1),
(2), (4) Date: Jul. 16, 2003

(87) PCT Pub. No.: WO02/05208

PCT Pub. Date: Jan. 17, 2002

Related U.S. Application Data

(60) Provisional application No. 60/216,395, filed on Jul. 6, 2000.

(51) Int. Cl.
*H03D 1/00* (2006.01)

(52) U.S. Cl. .................................................. 375/341
(58) Field of Classification Search ................ 375/341, 375/377, 229, 232, 316, 230, 340; 382/167, 382/162; 345/619, 620, 625, 643, 418; 396/281, 396/310, 439; 342/61, 66
See application file for complete search history.

(56) References Cited

U.S. PATENT DOCUMENTS 5,475,769 A * 12/1995 Wober et al. ................ 382/167
6,046,695 A * 4/2000 Poehler et al. ............. 342/25 A

FOREIGN PATENT DOCUMENTS

WO      WO 9418801 A1 *  8/1994

* cited by examiner

*Primary Examiner*—Pankaj Kumar
(74) *Attorney, Agent, or Firm*—Baker Botts LLP; Manu J Tejwani

(57) ABSTRACT

A resolution enhancement algorithm is trained on sample images to obtain a polynomial model mapping of low resolution image data to high resolution image data. The polynomial model mapping is applied to other low resolution images to obtain corresponding higher resolution images. The mapping provides resolution enhancement which is superior to that of conventional image data interpolation techniques.

6 Claims, 38 Drawing Sheets

FIG. 14

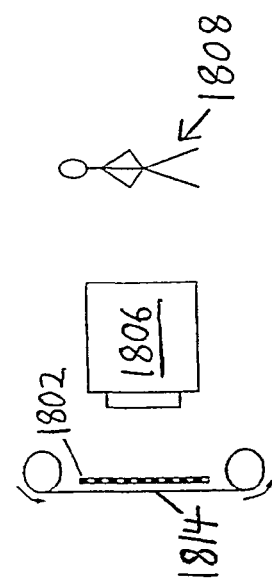
FIG. 18B
FIG. 18C
FIG. 18A

FIG. 30

METHOD AND APPARATUS FOR ENHANCING DATA RESOLUTION

CROSS-REFERENCE TO RELATED APPLICATION

This application claims priority to U.S. Provisional Patent Application entitled "Apparatus and Method For High Dynamic Range Color Imaging," Ser. No. 60/216,395, filed on Jul. 6, 2000, which is incorporated herein by reference in its entirety.

STATEMENT REGARDING FEDERALLY SPONSORED RESEARCH OR DEVELOPMENT

This invention was partially made with the U.S. Government support from the National Science Foundation, Information Technology Research Award No. IIS-00-85864. Accordingly, the U.S. Government may have certain rights in this invention.

BACKGROUND OF THE INVENTION

It is a common goal of image processing to obtain the highest quality image possible from a given set of input data. Image quality is typically judged in terms of "resolution," which generally refers to the accuracy and precision of the data which formed the image, and can include spatial resolution (e.g., pixels per unit area or per image), the precision and accuracy of the characteristics of each pixel (e.g., dynamic range of brightness and/or color), and/or the number of image frames per unit time (e.g., for video applications). Conventional image-processing algorithms typically ignore information and knowledge which is extrinsic to the data being processed, but is nonetheless relevant. As a result, the resolution of an image produced using a conventional image-processing algorithm is reduced. In particular, although input image can theoretically have virtually any characteristics, the characteristics of most images are limited by the laws of physics governing the physical objects being imaged. In addition, although an object can in theory have almost any shape, there are certain shapes which tend to recur more frequently than others.

For example, although it is theoretically possible for an image to include a brightness impulse—i.e., an infinitely tiny point of infinite brightness—such a phenomenon never occurs in real life. In addition, images of real objects are often filled with simple geometric shapes such as, for example, lines, rectangles, ellipses, flat surfaces, and smoothly rounded surfaces. Rarely in practice does an image of a real, physical scene consist primarily of a set of completely random shapes distributed in a completely random fashion. Yet, conventional image-processing algorithms largely ignore the aforementioned practical limitations which govern most images.

One conventional approach for enhancing dynamic range is to sequentially capture multiple images of the same scene using different exposure amounts. The exposure amount for each image is controlled by varying either the aperture of the imaging optics or the exposure time of the image detector. A high-exposure image (i.e., an image captured using a wide aperture or long exposure time) will tend to be saturated in the bright scene areas but more accurately captured in the dark regions. In contrast, a low-exposure image (i.e., an image captured using a small aperture or short exposure time) will tend to have less saturation in bright regions, but may be too dark and noisy in dark areas. The complementary nature of such high-exposure and low-exposure images allows them to be combined into a single high dynamic range image. Such an approach can be further enhanced by using the acquired images to compute the radiometric response function of the imaging system.

The above methods are better suited to static scenes than to moving scenes, because in order to obtain good results, it is preferable for the imaging system, the scene objects, and the radiances of the objects to remain constant during the sequential capture of images under different exposures. However, the stationary scene requirement has, in some cases, been remedied by the use of multiple imaging systems. In such an approach, beam splitters are used to generate multiple copies of the optical image of the scene. Each copy is detected by an image detector whose exposure is preset by using an optical attenuator or by setting the exposure time of the detector to a particular value. The exposure amount of each detector is set to a different value. This approach has the advantage of producing high dynamic range images in real time. Real time imaging allows the scene objects and/or the imaging system to move during the capture, without interfering with the processing of the multiple image copies. A disadvantage is that this approach is expensive because it requires multiple image detectors, precision optics for the alignment of all of the acquired images, and additional hardware for the capture and processing of the multiple images.

Another approach which has been used for high dynamic range imaging employs a special CCD design. In this approach, each detector cell includes two sensing elements having potential wells of different sizes—and therefore, different sensitivities. When the detector is exposed to the scene, two measurements are made within each cell and the measurements are combined on-chip before the image is read out. However, this technique is expensive because it requires fabrication of a complicated CCD image sensor. In addition, the spatial resolution of the resulting image is reduced by a factor of two, because the two sensing elements occupy the same amount of space as two pixels would occupy in an image detector with single sensing element cells. Furthermore, the technique requires additional on-chip electronics in order to combine the outputs of the two sensing elements in each detector cell before sending the signals off the chip for further processing.

An "adaptive pixel" approach for high dynamic range imaging has also been proposed. Such an approach employs a solid state image sensor in which each pixel includes a computational element which measures the time required to accumulate charge in the potential well to full capacity. Because the well capacity is the same for all pixels, the time required to fill a well is proportional to the intensity of the light incident on the corresponding pixel. The recorded time values are read out and converted to a high dynamic range image. In some cases, this approach can provide increased dynamic range. However, although a 32×32 cell device has been implemented, it is likely to be difficult to scale the technology to high resolution without incurring high fabrication costs. In addition, because exposure times tend to be large in dark scene regions, such a technique is likely to have relatively high susceptibility to motion blur.

Image data can also be captured in the form of polarization data associated with image pixels. In particular, it has been proposed that an individual polarization filter be placed in front of each element in a detector array. For example, individual polarization filters can be added to individual color filters covering an array of detectors. The outputs of the detectors beneath the polarization filters can be used to estimate the polarization of the light striking adjacent detectors. However, such a technique sacrifices spacial resolution because with respect to the polarization data, it treats the entire region surrounding a pixel as a single pixel.

SUMMARY OF THE INVENTION

It is therefore an object of the present invention to provide an image-processing algorithm which makes use of information regarding typical characteristics of images which are likely to be processed by the algorithm.

It is a further object of the present invention to provide an image-processing algorithm which can utilize the aforementioned information to enhance the resolution of data.

These and other objects are accomplished by the following aspects of the present invention.

In accordance with one aspect of the present invention, a method for generating enhanced-resolution data comprises: (1) receiving a first set of data generated using a plurality of sensitivity characteristics arranged in a locally inhomogeneous measurement pattern; and (2) using a model to process the first set of data, thereby generating a second set of data, the model having a first model parameter which is determined using a learning procedure.

In accordance with an additional aspect of the present invention, a method for generating enhanced-resolution data comprises: (1) receiving a first datum representing a first value of at least one variable, the at least one variable having the first value in a first location in at least one dimension; (2) receiving a second datum representing a second value of the at least one variable, the at least one variable having the second value in a second location in the at least one dimension; and (3) using a polynomial model to process the first and second data, thereby generating at least a third datum, the polynomial model having: (a) a first polynomial coefficient controlling application of the polynomial model to the first datum; and (b) a second polynomial coefficient controlling application of the polynomial model to the second datum, wherein at least one of the first and second polynomial coefficients is determined using a learning procedure.

In accordance with a further aspect of the present invention, a method for measuring comprises: (1) performing a first measurement set comprising at least one measurement of a first signal set, the first signal set comprising at least one signal from a first region in at least one dimension, the first measurement set having first and second sensitivity characteristics with respect to the first signal set, the first sensitivity characteristic having a first characteristic type, and the second sensitivity characteristic having a second characteristic type; (2) performing a second measurement set comprising at least one measurement of a second signal set, the second signal set comprising at least one signal from a second region in the at least one dimension, the second measurement set having the first sensitivity characteristic with respect to the second signal set, the second measurement set further having a third sensitivity characteristic with respect to the second signal set, and the third sensitivity characteristic having the second characteristic type; and (3) performing a third measurement set comprising at least one measurement of a third signal set, the third signal set comprising at least one signal from a third region in the at least one dimension, the third measurement set having a fourth sensitivity characteristic with respect to the third signal set, the fourth sensitivity characteristic having the first characteristic type.

In accordance with yet another aspect of the present invention, a method for measuring comprises: (1) performing a first measurement set comprising at least one measurement of a first signal set, the first signal set comprising at least one signal from a first region in at least one dimension, the first measurement set having first, second, and third sensitivity characteristics with respect to the first signal set, the first sensitivity characteristic having a first characteristic type, the second sensitivity characteristic having a second characteristic type, and the third sensitivity characteristic having a third characteristic type; and (2) performing a second measurement set comprising at least one measurement of a second signal set, the second signal set comprising at least one signal from a second region in the at least one dimension, the second measurement set having the first sensitivity characteristic with respect to the second signal set, the second measurement set further having fourth and fifth sensitivity characteristic with respect to the second signal set, the fourth sensitivity characteristic having the second characteristic type, and the fifth sensitivity characteristic having the third characteristic type.

BRIEF DESCRIPTION OF THE DRAWINGS

Further objects, features, and advantages of the present invention will become apparent from the following detailed description taken in conjunction with the accompanying figures showing illustrative embodiments of the invention, in which:

FIG. 14 is a matrix diagram illustrating an exemplary procedure for enhancing data resolution in accordance with the present invention;

FIG. 18A is a diagram illustrating an exemplary manner of using a detector sensitivity pattern in accordance with the present invention;

FIG. 18B is a diagram illustrating an additional exemplary manner of using a detector sensitivity pattern in accordance with the present invention;

FIG. 18C is a diagram illustrating yet another exemplary manner of using a detector sensitivity pattern in accordance with the present invention;

FIG. 30 is a diagram illustrating still another exemplary detector sensitivity pattern in accordance with the present invention;

Figure 1:
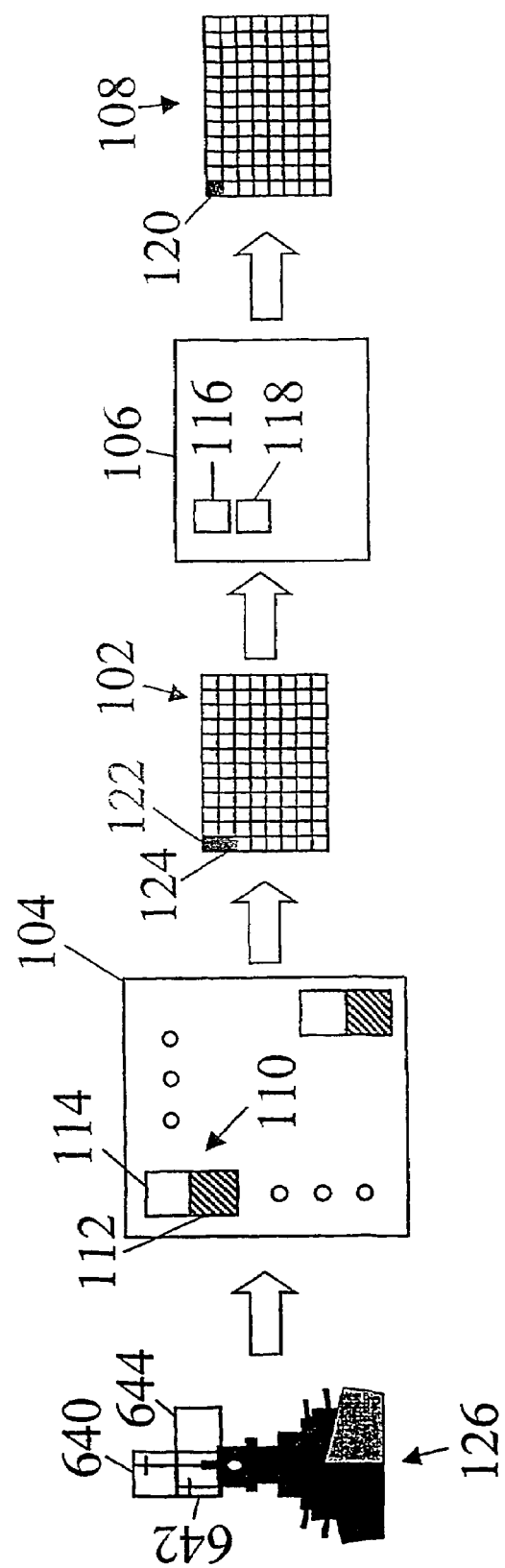
FIG. 1 is a block diagram illustrating an exemplary procedure for enhancing data resolution in accordance with the present invention.

Throughout the figures, unless otherwise stated, the same reference numerals and characters are used to denote like features, elements, components, or portions of the illustrated embodiments. Moreover, while the subject invention will now be described in detail with reference to the figures, and in connection with the illustrated embodiments, changes and modifications can be made to the described embodiments without departing from the true scope and spirit of the subject invention as defined by the appended claims.

DETAILED DESCRIPTION OF THE INVENTION

Many images are representations of real or imaginary physical scenes. Image data often comprises a set of pixel data in which each pixel datum represents an attribute—e.g., brightness and/or color—of a particular region or point within a scene. However, in addition to brightness and color, pixel data can include values of depth, light polarization, temperature, or any other physical attribute of the scene. Furthermore, although an image is often a representation of a physical attribute (e.g., brightness) of the scene as a function of spatial dimensions (e.g., vertical position, horizontal position, and/or depth position—e.g., distance from the camera or the observer), the attribute can also be represented as a function of other dimensions such as time. Typically, the available image data has limited resolution due to a limited number of pixels and/or limited dynamic range of each pixel (e.g., limited number of bits per pixel). Therefore, the accuracy with which image data represents the physical scene is limited. It would be desirable to process incoming image data to thereby generate higher-resolution data which more accurately and/or more precisely represents the scene.

Such data resolution enhancement would generate each higher resolution datum as a function of one or more of the incoming data. In particular, the data in one region of the incoming image would be used to generate higher resolution data in a corresponding region of the processed image. However, a higher resolution data set generally contains more information than a corresponding, lower resolution data set. For example, an image with more pixels contains more information than an image with fewer pixels if all of the pixels have the same dynamic range. In addition, a set of a particular number of high dynamic range pixels contains more information than a set of an equal number of lower dynamic range pixels. Therefore, if no extrinsic information is available—i.e., if there is no information available other than the incoming data itself—it may be impossible to reconstruct a higher-quality image from lower-quality data.

On the other hand, as discussed above, for many images, there is additional extrinsic information available; this information includes knowledge regarding shapes and patterns which are typically present, and expected to occur, in most images. In accordance with the present invention, such extrinsic information is incorporated into the parameters of a map between an incoming data set and a processed data set. The map—a/k/a/ the "model"—comprises a set of functions which are applied to the incoming data in order to generate the higher-resolution, processed data. The incorporation of the aforementioned extrinsic information is performed using a "learning" procedure (a/k/a a "training" procedure) which employs one or more representative sample images—or image portions—to optimize the parameters of the model. Once the model parameters are optimized, the resulting map can then be used to generate higher resolution data from lower resolution incoming data, because the optimized map provides an improved estimate of the likely "correct" value of the data (i.e., the image attribute) at each location of the image. In fact, the optimized map makes it possible to calculate an enhanced-quality estimate of the data (e.g., the image attribute value) in a location between the locations of the raw data, thereby enabling enhancement of the spatial or temporal resolution of the image or image sequence. In other words, the number of pixels or image frames can be increased by the addition of extra pixels or frames. In accordance with the present invention, the extra data need not be simply interpolated values based on neighboring pixels or frames, but can instead constitute intelligent predictions based upon learned knowledge regarding the features of typical images or other data. It is to be noted that although the technique of the present invention is especially beneficial for improving the quality of image-related data, the discussion herein is not meant to imply any limit to the types of data for which the technique can be used. For example, the technique of the present invention can be applied to: (a) 1-dimensional data such as a time sequence of values of financial instruments or other values; (b) 2-dimensional data such as flat image data; (c) 3-dimensional data such as image data which includes depth information, or video data comprising a time sequence of 2-dimensional image data; (d) 4-dimensional data such as 3-dimensional video data comprising a time sequence of image data which includes depth information; or (e) other types of data in any number of dimensions.

FIG. 1 illustrates an example of the processing of a set of data to generate enhanced-resolution data in accordance with the present invention. In the illustrated example, a first set 102 of data, which can be, for example, a raw image, is received from a detector array 104. The first data set 102 includes first and second data 122 and 124 which can be, for example, pixels of a raw image. The first datum 122 represents a first value of at least one variable such as, for example, the brightness of a first portion 640 of a scene being imaged. In particular, if a first location 640 on the surface of a physical object 126 within the scene has a particular brightness, the first datum 122 represents that brightness. Similarly, the second datum 124 can represent the brightness of a second location 642 on the surface of a physical object 126 within the scene. A model 106 is used to process the first data set 102, thereby generating a second data set 108. Preferably, the model 106 includes a first model parameter 116 which controls the application of the model 106 to the first datum 122, and a second model parameter 118 which controls the application of the model 106 to the second datum 124. The second set of data 108 includes a third datum 120 which has been generated by application of the model 106 to the first and second data 122 and 124.

Figure 4:
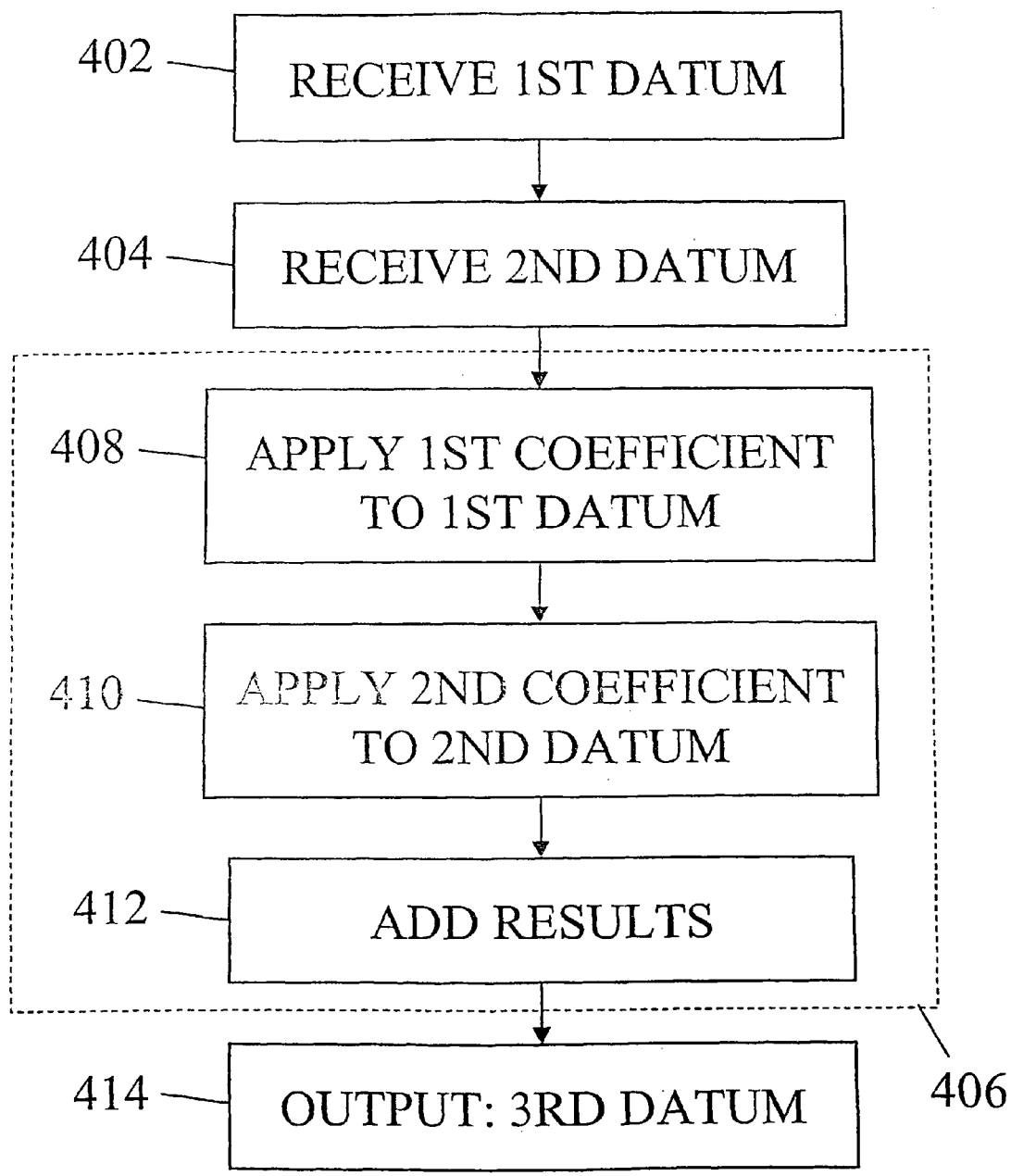
FIG. 4 is a flow diagram illustrating an additional exemplary procedure for enhancing data resolution in accordance with the present invention.

In a preferred embodiment of the present invention, the map 106 comprises a set of polynomial functions of the data in the first data set 102. The first and second data 122 and 124 can be processed according to the algorithm illustrated in FIG. 4. In the illustrated algorithm, the first datum is received (step 402). The second datum is also received (step 404). The model 106 is used to process the first and second data (step 406), thereby generating the third datum 120 (step 414). If a polynomial model is used, step 406 preferably comprises applying a first polynomial coefficient to the first datum 122 (step 408), applying a second polynomial coefficient to the second datum 124 (step 410), and adding the result of steps 408 and 410 (step 412). Application of a polynomial coefficient to a datum typically comprises multiplying the coefficient by a mathematical power of the datum.

Figure 8A:
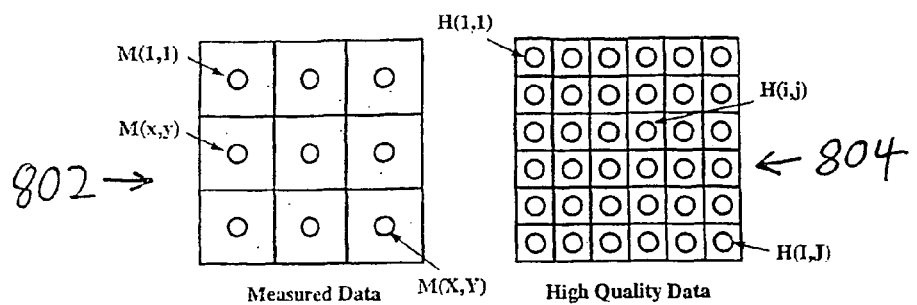
FIG. 8A is a diagram illustrating the processing of an input data set to obtain a higher resolution data set in accordance with the present invention.
Figure 8B:
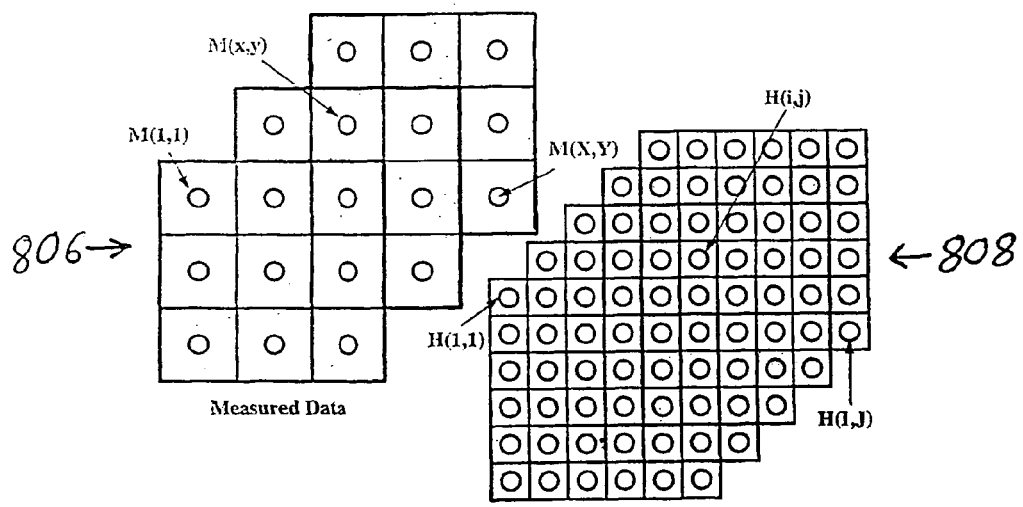
FIG. 8B is a diagram illustrating the processing of an additional input data set to obtain a higher resolution data set in accordance with the present invention.

Preferably, the model 106 comprises a set of local mapping functions which receive pixel measurements from a small neighborhood within a captured image, and transform the pixel measurements to a desired output image value (or values). The mapping functions are "learned" by comparing samples of high quality data (e.g., high resolution image data) to samples of low quality data which have been computed from the high quality data. For example, if the goal is to learn a structural model that processes a brightness image having low spatial resolution, thereby generating a brightness image having high spatial resolution, the high resolution image can be intentionally degraded (blurred and down-sampled) to generate the corresponding low resolution image. As another example, if the model is to be optimized to compute a high dynamic range image (e.g., an image having 12 bits per pixel) from a sequence of low dynamic range images (e.g., images having 8 bits per pixel) corresponding to various different exposure levels, the high dynamic range image can be scaled, truncated, and re-quantized to thereby generate a set of test images having low dynamic range. In other words, a "downgrade" processing step is used to degrade the high quality image in order to synthesize low quality simulations of measured data for use in the training procedure. The relationship between exemplary high and low quality images is illustrated in FIGS. 8A and 8B. In the example of FIG. 8A, the low quality data set 802 is a low resolution version of the high quality data 804. Hence, for the same region in the two images, there are more samples in the high quality image than in the measured image. In the example of FIG. 8B, the high quality data set 808 includes a temporal dimension (i.e., time), and has higher spatial and/or temporal resolution than the low quality data set 806.

It is to be noted that the high quality images used in the learning stage can be images of real scenes, synthetic images generated using a variety of rendering techniques, or some combination of real and synthetic image data. Images of real scenes can be acquired using high quality (e.g., professional grade) imaging systems, and if the high quality images are degraded using a model which simulates the features and shortcomings of a low quality imaging system, the resolution enhancement techniques of the present invention can enable lower quality imaging systems to emulate the performance of high quality systems. The structural models used by the algorithm are preferably as general as possible, and accordingly, the images chosen for the training procedure should adequately represent the full range of the types of scenes and features that one would expect to encounter in the real world. For example, images of urban settings, landscapes and indoor spaces are preferably included. In addition, the selected images preferably represent the full range of illumination conditions encountered in practice, including indoor lighting, overcast outdoor conditions, and sunny outdoor conditions. In addition, it is usually beneficial to include images of the same scene taken under various different magnification settings and rotations, in order to enable the structural model optimization process to capture the effects of scaling and orientation. Synthetic images can be particularly useful, because one can easily include within them specific features that may be relevant to a particular application. For example, in generating synthetic images, it is relatively easy to render edges, lines, curves, and/or more complex features at various orientations and scales. In addition, specific types of surface textures can readily be synthesized in computer-generated images.

Figure 9:
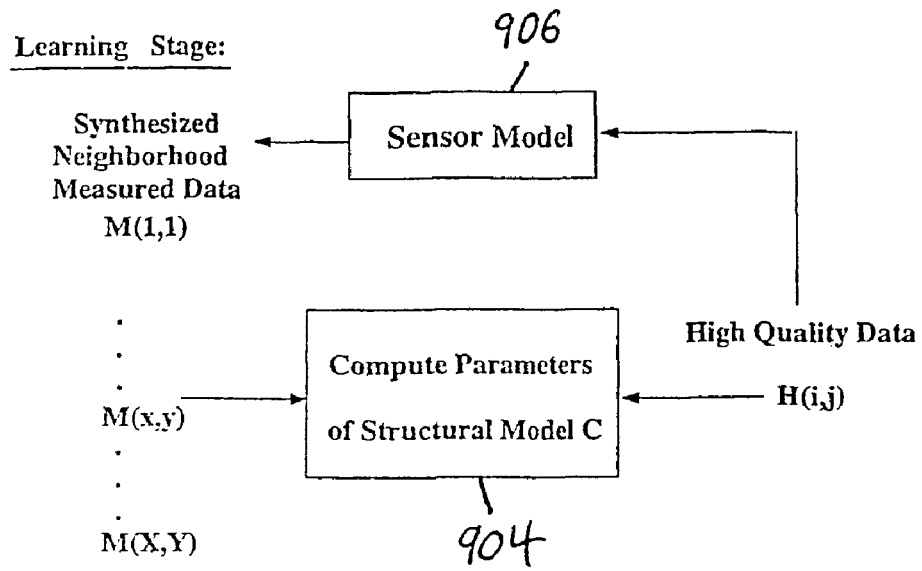
FIG. 9 is a flow diagram illustrating an exemplary procedure for enhancing data resolution in accordance with the present invention.

Once the high quality images and their corresponding low quality images have been obtained, it is desirable to estimate one or more structural mapping models. An exemplary procedure for performing the estimate is illustrated in FIG. 9. The structural model 902 of the illustrated example is a general function that relates input data M(x, y) (e.g., real measured data or simulated data) to a set of desired output values H(i, j). The relationship between the input and output data can be expressed as follows:

$$H(i,j)=f(M(1,1), \ldots, M(x,y), \ldots M(X,Y)), \quad (1)$$

where X and Y define a neighborhood of the input measured data M (x,y) which preferably surrounds, or is near, the corresponding neighborhood of the high quality value H(i,j). Estimation of a structural model essentially constitutes the estimation of the parameters of the function f in Eq. (1).

It is to be noted that the function f in this example has been defined in general terms. The function f can be linear or non-linear. Its parameters can optionally be estimated using any of a number of different regression techniques. The regression methods can be linear or non-linear, and can include techniques such as elimination of outlying points during fitting, as is commonly used in the art of robust statistics. Furthermore, the function f can comprise a combination of basis functions in which the function coefficients are the parameters of the model to be estimated.

Figure 3:
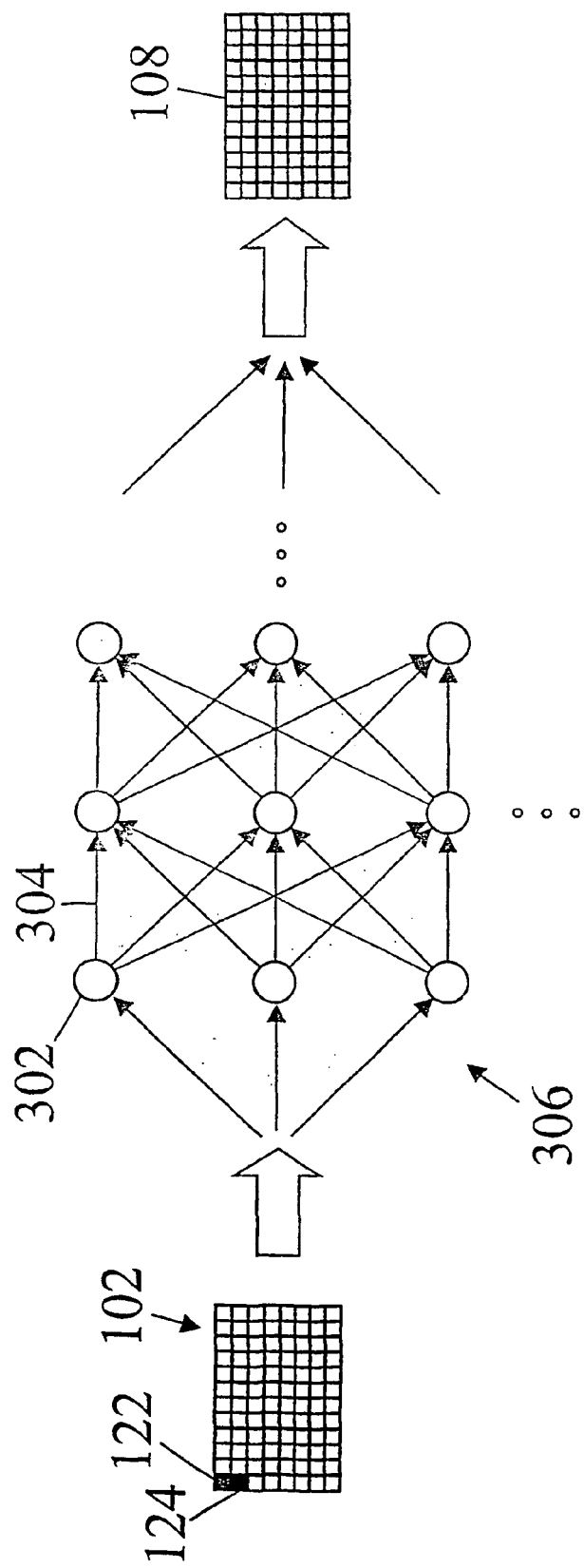
FIG. 3 is a block diagram illustrating an exemplary procedure for enhancing data resolution in accordance with the present invention.

In addition, the model 106 can comprise a network 306, as illustrated in FIG. 3. In the example illustrated in FIG. 3, the first data set 102 is received into a network 306 which includes a plurality of nodes 302 connected by various links 304. The network 306 can comprise, for example, a Markov network, a Bayesian network, and/or a neural network—all of which are well-known. The network 306 processes the first set of data 102, thereby generating the second set of data 108 which has improved resolution. If the function is to be implemented as a Bayesian or neural network, its parameters can be estimated using a variety of well-known methods such as the back-propagation algorithm. Furthermore, the model can optionally comprise a hidden Markov model. In a preferred embodiment, the desired high quality value is modeled as a polynomial function of the input data. Regardless of the form of the model, the algorithm of the present invention seeks to determine and optimize a set C of coefficients or other model parameters. As discussed above, high quality training images (real, synthetic, or both) are used to compute these coefficients (step 904). Note that each high quality training image typically provides a large amount of data useful for finding the coefficients, because the neighborhoods (of size (X,Y)) used in the procedure are generally small; a typical example would be a 5×5 window of low quality pixels surrounding the location of the high quality pixel whose value is ultimately to be computed.

Once the structural model 902 has been computed in the above-described manner, reconstruction of the data can be performed. The reconstruction process involves applying the model to low quality data, as illustrated in FIG. 9. The low quality data can come from a physical measurement device or can be "synthetic" low quality data generated from, and used in place of, the high quality data, for purposes of efficient storage and/or transmission. Furthermore, the low quality data can be synthesized from high quality data, by using a model (item 906 in FIG. 9) of a relatively low quality sensor.

Each output image value is obtained from the reconstruction process:

$$\tilde{H}(i,j)=f(M(1,1), \ldots, M(x,y), \ldots M(X,Y)). \quad (2)$$

For many applications it is beneficial to measure incoming image signals using a locally inhomogeneous measurement pattern—i.e., a pattern in which one sensor has sensitivity characteristics which differ significantly from the characteristics of adjacent or nearby sensors. Such a pattern—which can also be referred to as a "mosaic"—is to be distinguished from effects such as "vignetting," in which the sensitivity of a detector array tends to gradually diminish from the center to the edges. Vignetting effects occur on a scale comparable to the size of the entire array.

Due to the limited dynamic range of most light intensity sensors, and the high dynamic range of the human eye, it can be desirable to utilize a pattern of sensors having different sensitivities to the intensity (i.e., brightness) of incoming light. Such a pattern makes it possible to accurately measure the brightness of both well-lit and poorly-lit portions of the scene. An example of such a locally inhomogeneous measurement pattern is illustrated in FIG. 1. The pattern 110 includes a first region 114 having a high sensitivity to the intensity of incoming light, and a second region 112 which has a reduced sensitivity to intensity of incoming light. The locally inhomogeneous measurement pattern 110 can be repeated numerous times to form a larger, locally inhomogeneous measurement pattern for use in a detector array 104. The resulting image can be referred to as a "spatially varying exposure" (SVE) image. In the example illustrated in FIG. 1, light coming from a first portion 640 of an object 126 in the scene is received by the first portion 114 of the measurement pattern 110. Light coming from a second location 642 on the surface of the object 126 is received by the second portion 112 of the measurement pattern for use in a detector array 110. Preferably, the first model parameter 116 of the model 106 corresponds, and is matched and optimized, to the sensitivity characteristic (i.e., high sensitivity) of the first portion 114 of the measurement pattern 110, and the second model parameter 118 corresponds, and is matched and optimized, to the sensitivity characteristic (i.e., reduced sensitivity) of the second region 112 of the measurement pattern 110. Just as the locally inhomogeneous measurement pattern 110 can be repeated to form a larger pattern for the detector array 104, the first and second model parameters 116 and 118 are preferably reused for each copy of the first and second portions 114 and 112 of the measurement pattern 110. Such a configuration is beneficial because raw data sampled using a sensor having a first sensor characteristic is likely to have a relationship to the scene which is different from that of raw data sampled using a sensor having a different sensitivity characteristic. Therefore, when determining and optimizing the parameters 116 and 118 of the map 106, each sensitivity characteristic is preferably assigned its own map parameter.

Figure 17:
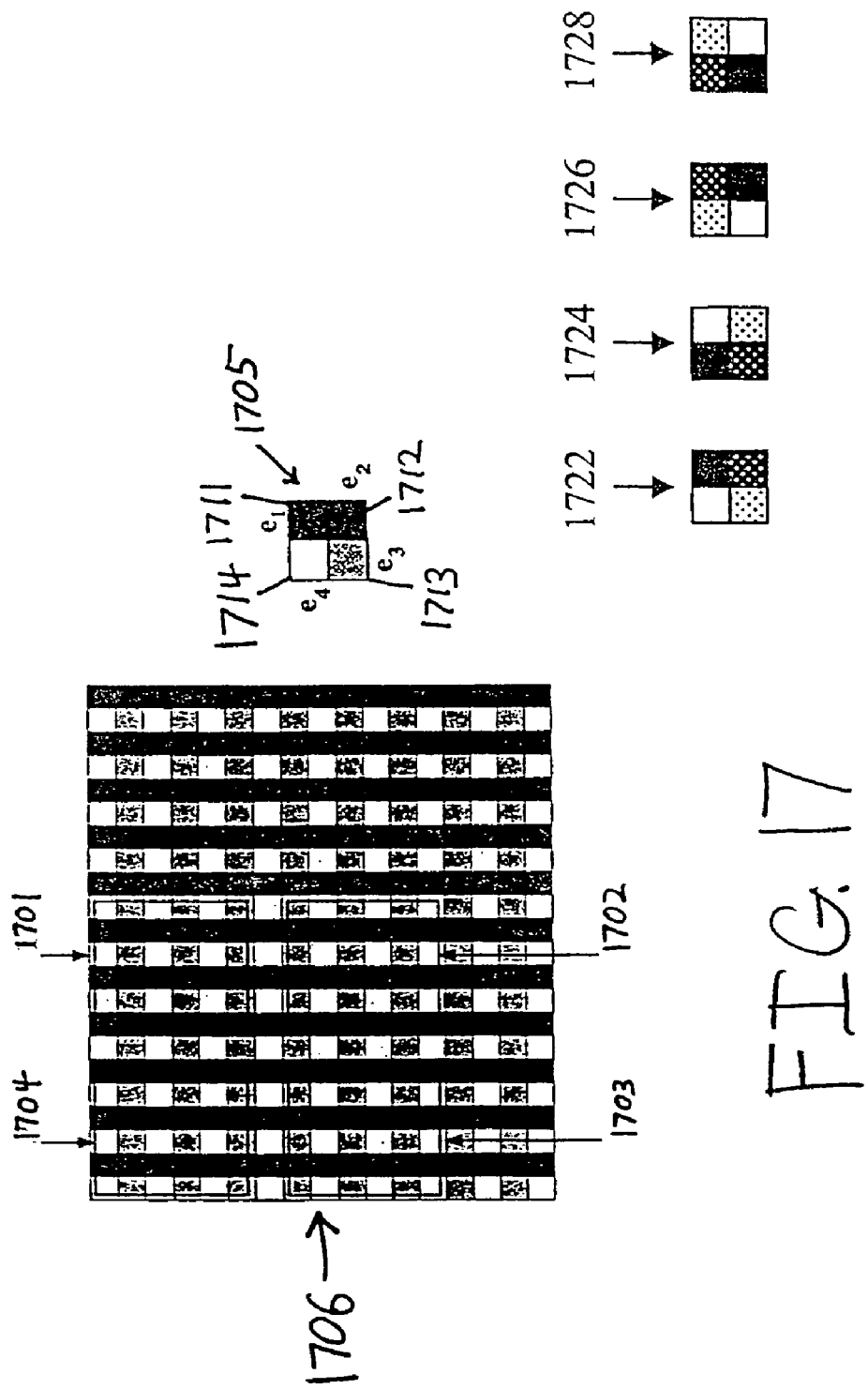
FIG. 17 is a diagram illustrating an exemplary detector sensitivity pattern in accordance with the present invention.

FIG. 17 illustrates an additional spacially inhomogeneous brightness sensitivity (i.e., SVE) pattern. The pixels illustrated as lighter in the drawing have greater sensitivity to incoming light intensity, and the darker pixels have lower sensitivity. In the illustrated example, four neighboring pixels 1711, 1712, 1713, and 1714 have different sensitivities ($e_1<e_2<e_3<e_4$). These four pixels 1711, 1712, 1713, and 1714 form a 2×2 neighborhood 1705 which is repeated to cover the detector array. An SVE image based on a four-value sensitivity pattern has four different types of local neighborhood intensity sensitivity patterns 1722, 1724, 1726, and 1728 which correspond to the distinct cyclic shifts of the 2×2 neighborhood 1705.

An SVE pattern is beneficial, because even when a pixel is saturated, the pixel is likely to have at least one neighbor which is not saturated. In addition, even when a pixel in an SVE pattern registers very low or zero brightness, or has a low signal-to-noise ratio, the pixel is likely to have at least one neighbor which registers measurable brightness and/or has an acceptable signal-to-noise ratio. As a result, an SVE pattern enables computation of a high dynamic range image of the scene.

It is further to be noted that SVE techniques are by no means restricted to the mosaic illustrated in FIG. 17. The number of brightness sensitivity values—and accordingly, the number of different local pattern types—can be varied, and the pattern need not be periodic. There may be cases in which a randomly arranged exposure mosaic would be useful. In addition, an SVE mosaic can be implemented in many ways. One approach is to cover the detector array with a mask comprising cells having different optical transparencies. Alternatively, or in addition, the sensitivity pattern (i.e., the mosaic) can be etched directly onto the detector, particularly if the detector is solid state device such as a CCD array. Furthermore, the sensitivity of the pixels can be preset by additional techniques such as: (1) covering each pixel with a differently configured microlens, (2) using a variety of different integration times for different pixels, and/or (3) covering each pixel with a different aperture. All of the aforementioned implementations can be used to provide a detector array with a spatially varying brightness sensitivity pattern.

It can be particularly convenient to use an optical mask having a mosaic of cells with different transparencies, because such an approach can be implemented by making very simple modifications to virtually any imaging system. FIGS. 18A–18C illustrate several ways to incorporate an optical mask into an imaging system. In FIG. 18A, the mask 1802 is placed adjacent to the plane of the detector 1804. The mask 1802 can also be placed outside the imaging lens 1806, which is usually preferable for systems in which access to the detector plane 1804 is difficult. In the example illustrated in FIG. 18B, a primary lens 1810 is used to focus the scene 1808 onto the plane of the mask 1802. The light rays that emerge from the mask 1802 are received by the imaging lens 1806 and focused onto the plane of the detector 1804. A diffuser 1812 can be used to reduce or eliminate the directionality of rays arriving at the mask 1802, in which case the imaging lens 1806 is preferably focused at the plane of the diffuser 1812. FIG. 18C illustrates an arrangement by which a mask 1802 can be easily incorporated into a conventional photographic camera. In the example illustrated in FIG. 18C, the mask 1802 is fixed adjacent to the plane along which the film 1814 advances. It is to be noted that the SVE technique is by no means restricted to visible light. In fact, the dynamic range of any electromagnetic radiation imager or any other radiation imager can be enhanced using the SVE method.

In accordance with the present invention, a low dynamic range SVE image can be mapped to a high dynamic range image using local polynomial mapping functions. The SVE algorithm seeks to develop structural models to exploit spatio-exposure dimensions of image irradiance.

Figure 19:
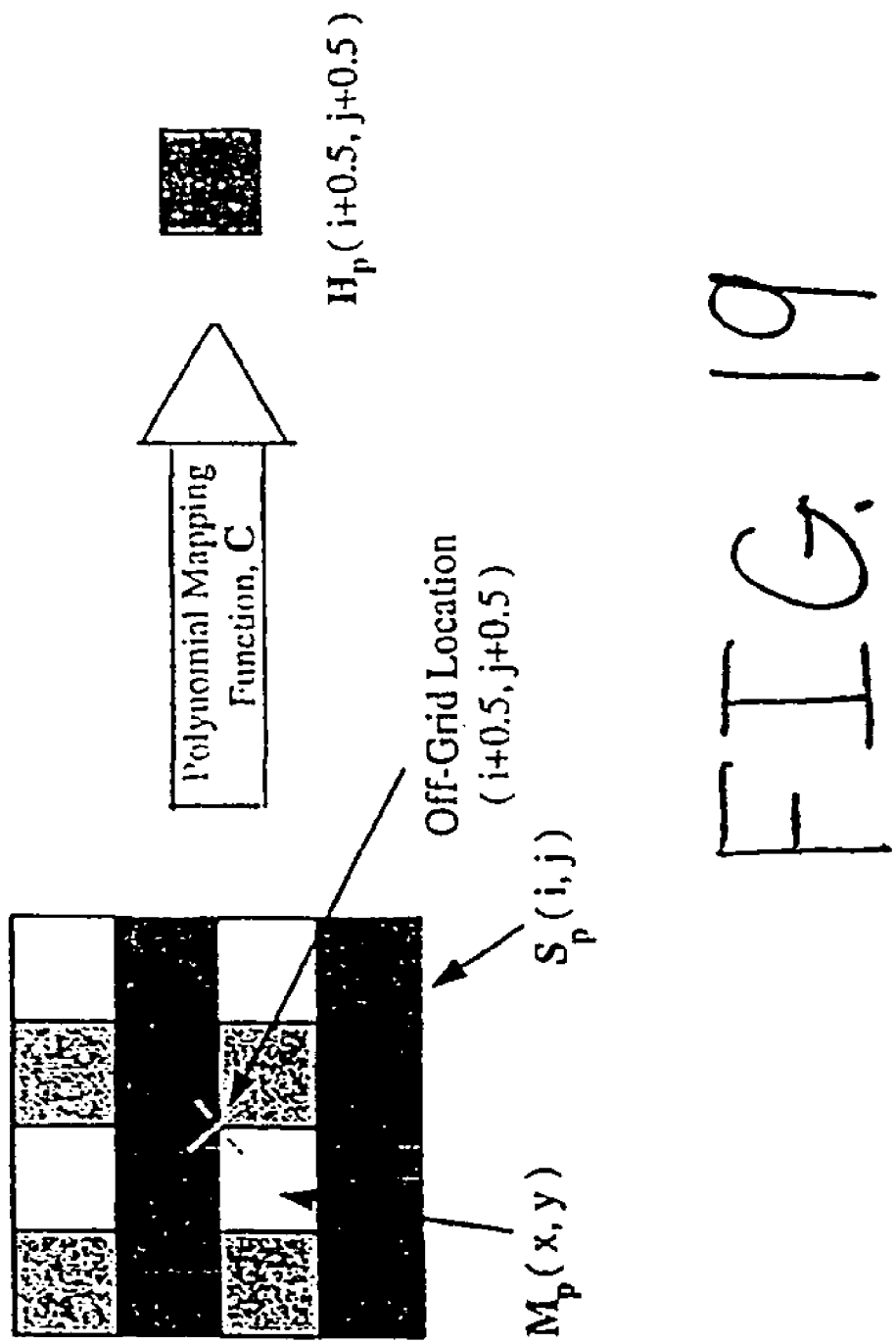
FIG. 19 is a block diagram illustrating the processing of input data using an exemplary polynomial mapping function in accordance with the present invention.

Let the measured data (e.g., data captured using an SVE sensor) be represented by M. A high dynamic range image H can be reconstructed from M using a set of structural models (i.e., mapping functions), one for each of the four types of local neighborhood patterns p. Let $M_p$ denote a neighborhood of M which has a particular local pattern p. The desired dynamic range value at the neighborhood center can be estimated as follows:

$$H_p(i+0.5, j+0.5) = \sum_{(x,y) \in S_p(i,j)} \sum_{(k \neq x, l \neq y) \in S_p(i,j)} \sum_{n=0}^{N_p} \sum_{q=0}^{N_p-n} C_p(x, y, k, l, n) M_p^n(x, y) M_p^q(k, l), \quad (3)$$

where $S_p(i, j)$ is the neighborhood of pixel (i, j), as illustrated in FIG. 19. $M_p^n(x,y) M_p^q(k,l)$ represents the product of: (1) the $n^{th}$ power of the raw value at point (x,y) within the neighborhood $M_p$, and (2) the $q^{th}$ power of the raw value at point (k,l) within the neighborhood $M_p$. $N_p$ is the order of the polynomial mapping. $C_p$ represents the polynomial coefficients of the local pattern p. Typically, information from pixels which are displaced, in the vertical direction, from pixel (i, j) is expected to be no more or less important than information from pixels which are displaced in the horizontal direction. Accordingly, it is generally preferable to use neighborhoods which are as wide as they are long—e.g., square neighborhoods. Furthermore, every intensity sensitivity characteristic (e.g., every exposure level) should preferably occur the same number of times in each neighborhood. For any even number of exposures, a neighborhood having even (rather than odd) length and width satisfies this condition. For example, the neighborhood $S_p(i, j)$ illustrated in FIG. 19 is a square neighborhood having even length and width. The high dynamic range value is computed at the off-grid neighborhood center (i+0.5, j+0.5).

The product $M_p$ (x, y) $M_p$ (k, l) explicitly signifies the correlation between two pixels of the neighborhood. However, in many cases, using the product terms—i.e., explicitly computing and including the correlation terms—does not greatly add to the accuracy and efficiency of the technique, because scene radiances which are nearby (in spatial position or other dimensions) tend to be naturally correlated. A preferred mapping function—which is much simpler and is therefore less computationally intensive—is given by:

$$H_p(i+0.5, j+0.5) = \sum_{(x,y) \in S_p(i,j)} \sum_{n=0}^{N_p} C_p(x, y, n) M_p^n(x, y). \quad (4)$$

It should be noted that, although FIG. 19 illustrates a square, 4×4 neighborhood, the method can be applied to neighborhoods having any size and shape, and can be used to compute the value of a pixel positioned in either an off-grid location or an on-grid location.

Figure 14:
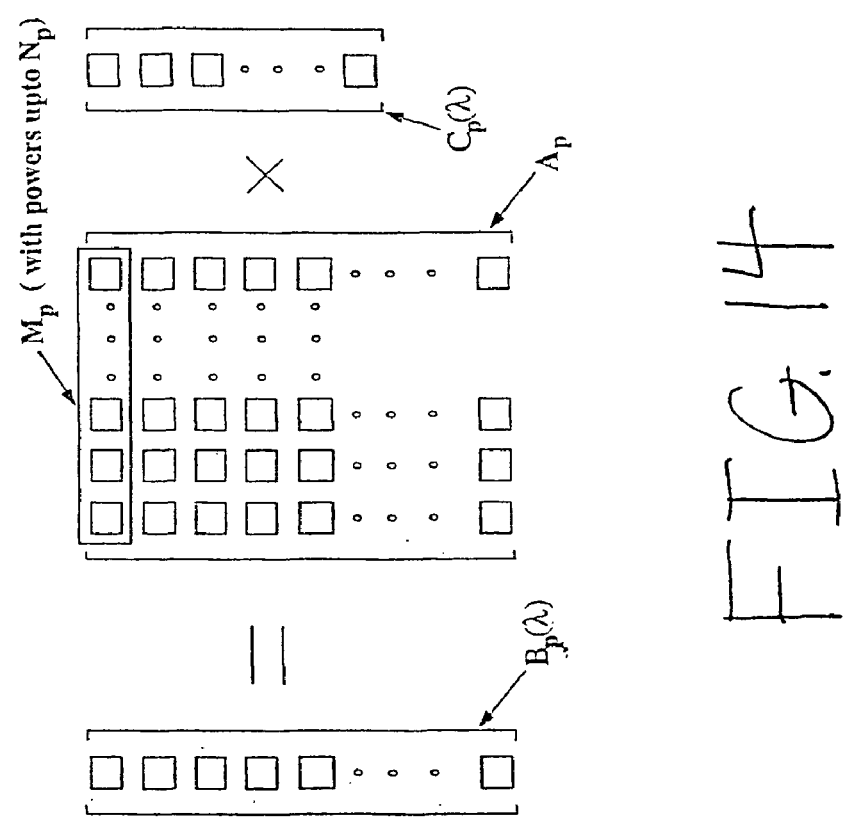

For each local pattern p, Eq. (4) can be expressed in terms of matrices, as illustrated in FIG. 14.

$$B_p = A_p C_p, \qquad (5)$$

where each row of the matrix $A_p$ contains powers of the pixel values of a neighborhood $M_p$ which has a local pattern type p. Each row of $A_p$ contains pixel value powers up to polynomial order $N_p$. $C_p$ is a column vector containing the polynomial coefficients corresponding to each of the pixels in the neighborhood having local pattern p. $B_p$ is a column vector containing the desired off-center neighborhood center values $H_p$ for each p.

The mapping functions corresponding to the different local exposure patterns are estimated using a weighted least squares technique. One example of such a technique is to solve the weighted normal equation:

$$A_p^T W_p^2 A_p C_p = A_p^T W_p^2 B_p, \qquad (6)$$

where $W_p$ is a diagonal matrix that weights each of the neighborhood linear equations. In least squares terminology, $A_p^T W_p^2 A_p$ can be referred to as the "weighted normal matrix," and $A_p^T W_p^2 B_p$ can be referred to as the "weighted regression vector."

The number of coefficients in the polynomial mapping function can be calculated as follows. Let u×v represent the neighborhood size, and let $N_p$ represent the polynomial order corresponding to the local exposure pattern p. Let P represent the number of distinct local patterns in the SVE image. The number |C| of coefficients is then given by the following equation:

$$|C| = P + uv \sum_{p=1}^{P} N_p. \qquad (7)$$

For example, when P=4 (e.g., for SVE detectors with 4 different pixel exposures), $N_p=2$ for p=1 . . . P, and u=v=6 (i.e., a square neighborhood having even length and even width), the number of coefficients is 292.

An algorithm in accordance with the present invention can be used to learn (i.e., optimize) the local polynomial mapping function by processing several different images captured using high dynamic range sensors. Then, using the optimized mapping function, high dynamic range images can be reconstructed from other images captured by SVE sensors. In the training stage, a training algorithm estimates the coefficients of the local polynomial mapping function for each type of neighborhood pattern (e.g., patterns 1701–1704 in FIG. 17), using high dynamic range images.

Figure 20:
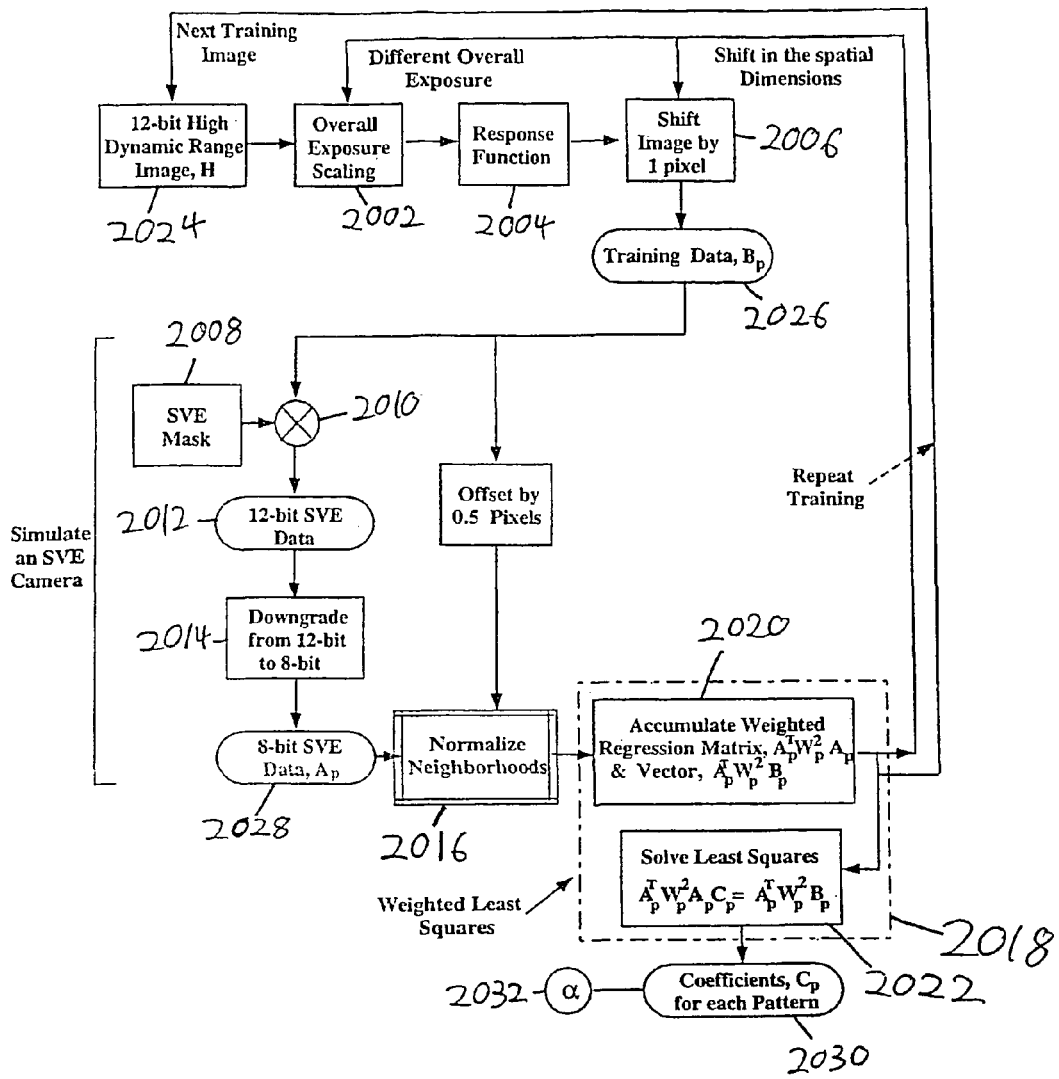
FIG. 20 is a block diagram illustrating an exemplary procedure for enhancing data resolution in accordance with the present invention.

FIG. 20 is a flow chart of an exemplary training stage in accordance with the present invention. In the example illustrated in FIG. 20, the training is performed using 12-bit images 2024 captured by a film camera and scanned by a slide scanner. The intensities of the images are scaled to simulate a change in overall exposure of the sensor (step 2002). A response function 2004 matching that of an SVE detector is applied to the training images. Then, the scaled images are translationally shifted (i.e., shifted in position) in order to train the algorithm (i.e., optimize the model parameters) for each type of exposure pattern with each type of image neighborhood (step 2006). Next, an SVE mask 2008 is applied to the training image 2026 to thereby generate a 12-bit SVE image 2012 (step 2010). Then (in step 2014), 12-bit SVE image 2012 is downgraded (i.e., degraded) by clipping the data at a maximum intensity level of 255 and then by mapping or re-quantizing the data to thereby generate an 8-bit image M (item 2028 in FIG. 20). The above-described downgrading procedure simulates an SVE sensor having low dynamic range. From image M, the set of neighborhoods $A_p$ is extracted for each pattern p, as illustrated in FIG. 14. Similarly, the column vector $B_p$ is extracted from the training image H. In order to avoid asymmetries in the numbers of different intensity sensitivities (e.g., $e_1$, $e_2$, $e_3$, and $e_4$ in FIG. 17), it is preferable to use square neighborhoods having even (rather than odd) length and width. The center of a neighborhood having even length and/or width is at an off-grid location, as illustrated in FIG. 19. In order to compensate for the resulting half-pixel offset, the training images are themselves offset by a half-pixel. If the original sampling of the high quality images did not adhere to Nyquist's criteria for signal reconstruction, the offset can introduce further blurring into the images, thereby resulting in coefficients which are optimized for blurry or smooth images and scenes. If optimization for sharper images and scenes is desired, the initial high resolution images should preferably represent sharp scenes with sharp features, and should be sampled in conformance with Nyquist's criteria. However, it is to be noted that enhancement of sharp images typically requires a more accurate model than enhancement of smooth and/or blurry images. Furthermore, even sharp images tend to include significant amounts of smooth area. Therefore, if at the time of training, there is no way to know the level of sharpness of the images which will later be enhanced by the algorithm, it is preferable to use sharp images for training, because the accuracy of the model will be most important for enhancing sharper images, and in any case, the sharp training images are likely to include enough smooth area to also enable enhancement of smooth and/or blurry images.

Every neighborhood belonging to any local pattern type in the SVE data is normalized. The normalization is accomplished by first subtracting, from each datum of each p-type neighborhood, the average energy $\mu_p$ of all the neighborhoods $A_p$ that are of the p type, and then dividing the data by the energy of $A_p(i)$. Mathematically, the normalization step can be expressed as follows:

$$A_{pnorm}(i) = \frac{A_p(i) - \mu_p}{\|A_p(i)\|}, \qquad (8)$$

where the energy of $A_p(i)$ (i.e., the denominator) is the magnitude a selected portion of the $i^{th}$ row vector of the matrix $A_p$ shown in FIG. 14. This selected portion of the $i^{th}$ row vector is the portion containing the first powers of the neighborhood pixel values. The training data $B_p$ is similarly normalized:

$$B_{pnorm}(i) = \frac{B_p(i) - \mu_p}{\|A_p(i)\|}. \qquad (9)$$

After normalization (step 2016), a weighted least squares procedure (step 2018) is used to compute the weighted normal matrix $A_{pnorm}^T W_p^2 A_{pnorm}$ and the right hand side regression vector $A_{pnorm}^T W_p^2 B_{pnorm}$. In the least squares procedure 2018, for every training image, the normal matrix and the regression vector are each additively accumulated (step 2020). The least squares results are then computed (step 2022). Once all of the high dynamic range images have been used for training, including training with multiple exposures and multiple translational shifts, the coefficients $C_p$ (item 2032 in FIG. 20) of the polynomial mapping function are computed for each type of neighborhood pattern p, using Eq. (6) (step 2030).

Figure 21:
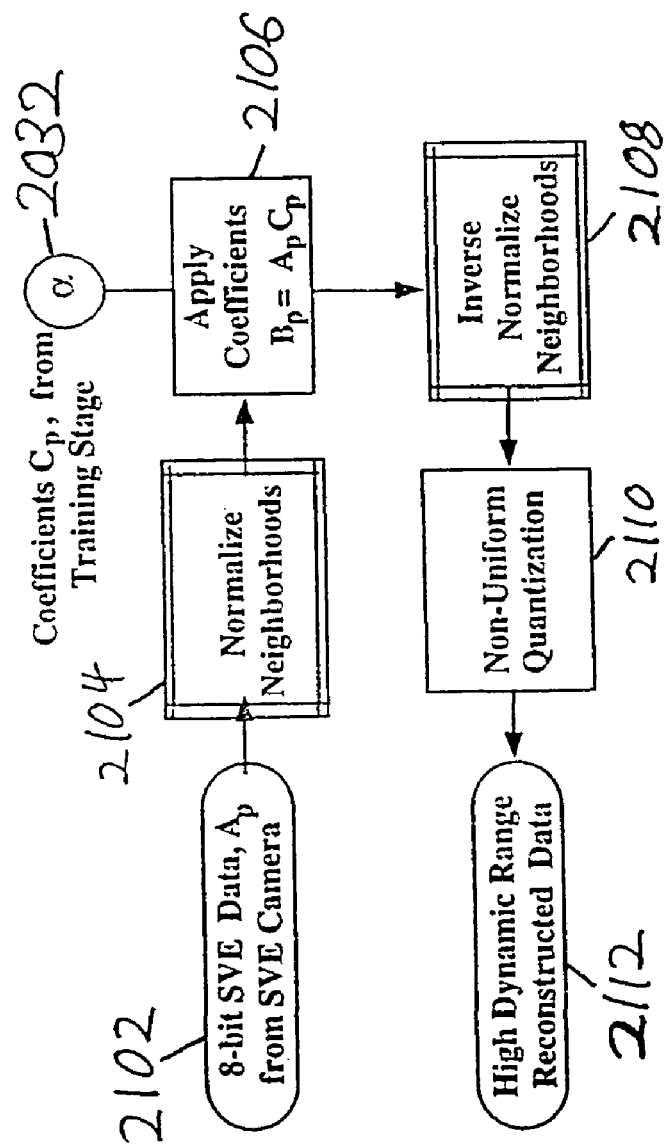
FIG. 21 is a flow diagram of an additional exemplary procedure for enhancing data resolution in accordance with the present invention.

In the reconstruction stage, an example of which is illustrated in FIG. 21, a reconstruction algorithm applies the polynomial coefficients 2032—which were computed in the training stage—to SVE images 2102 captured using a low dynamic range 8-bit SVE sensor. Similarly to the training algorithm, the reconstruction algorithm normalizes each of the neighborhoods $A_p$ which corresponds to each local pattern p (step 2104). The coefficients $C_p$ (item 2032) are then applied to each of the normalized neighborhood patterns to thereby obtain $B_{pnorm}=A_{pnorm}C_p$ (step 2106). Next, $B_{pnorm}$ is inverse-normalized (i.e., unnormalized) to obtain $B_p$ (step 2108). Because the SVE technique uses non-uniform quantization of the scene intensity, the algorithm preferably non-uniformly quantizes the inverse normalized data, according to the number of discrete exposures used in the SVE detector mask (step 2110), to thereby obtain a reconstructed high dynamic range image 2112.

Figure 36:
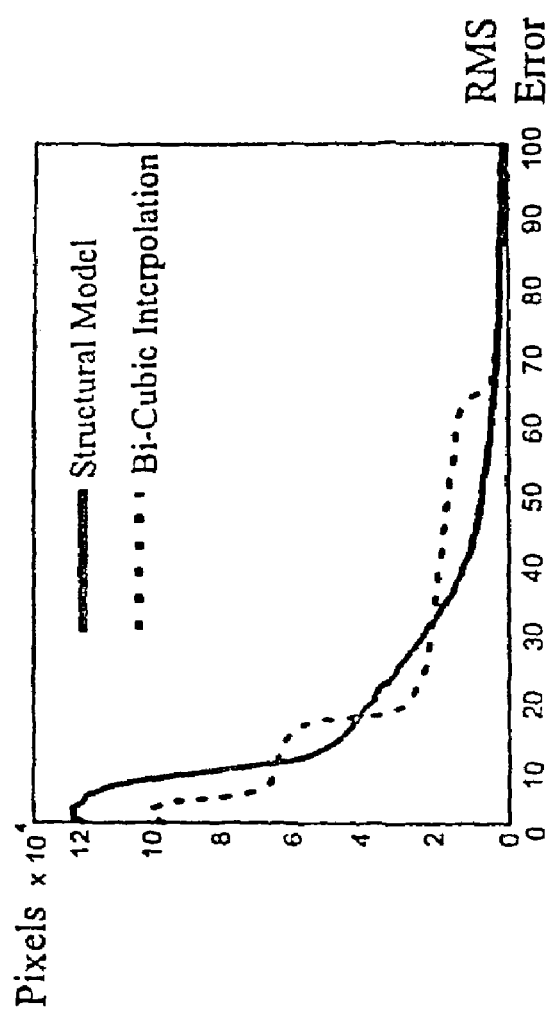
FIG. 36 is a graph illustrating the performance of an additional exemplary procedure for enhancing data resolution in accordance with the present invention.

An SVE method in accordance with the present invention has been tested using five high dynamic range (12-bit) training images representing a wide variety of natural scenes. In order to "train" (i.e., optimize) the mapping coefficients, each of the training images was downgraded (i.e., degraded) to obtain 8-bit SVE images, as illustrated in the flow chart of FIG. 20. In order to create the SVE images, each training image was captured using 4 different exposures ($e_1=4$ $e_2=16$ $e_3=64$ $e_4$), and then combined according to the SVE mask 1706 illustrated in FIG. 17. The coefficients of a local polynomial mapping function of order 3 was computed using a weighted least squares technique. For reconstruction, six 12-bit SVE test images—which were different from the images used in training—were downgraded to generate 8-bit SVE images. The resulting coefficients were applied to the downgraded, 8-bit SVE images according to the flow chart illustrated in FIG. 21. FIG. 36 is a histogram graph comparing the results of the above described procedure to a bi-cubic interpolated procedure. Comparison of the two histograms reveals that the method of the present invention yields more low-error pixels and fewer high-error pixels.

In the foregoing example, the locally inhomogeneous sensitivity characteristics were of a particular type—specifically, a type of dependence of sensor output with respect to light intensity. However, in accordance with the present invention, other sensitivity characteristic types can be used to form a locally inhomogeneous measurement pattern. For example, the sensitivity characteristics can have a type of dependence of measurement sensitivity with respect to signal wavelength (e.g., color). Furthermore, the characteristic type can be a type of dependence of measurement sensitivity with respect to incoming light polarization.

Figure 2:
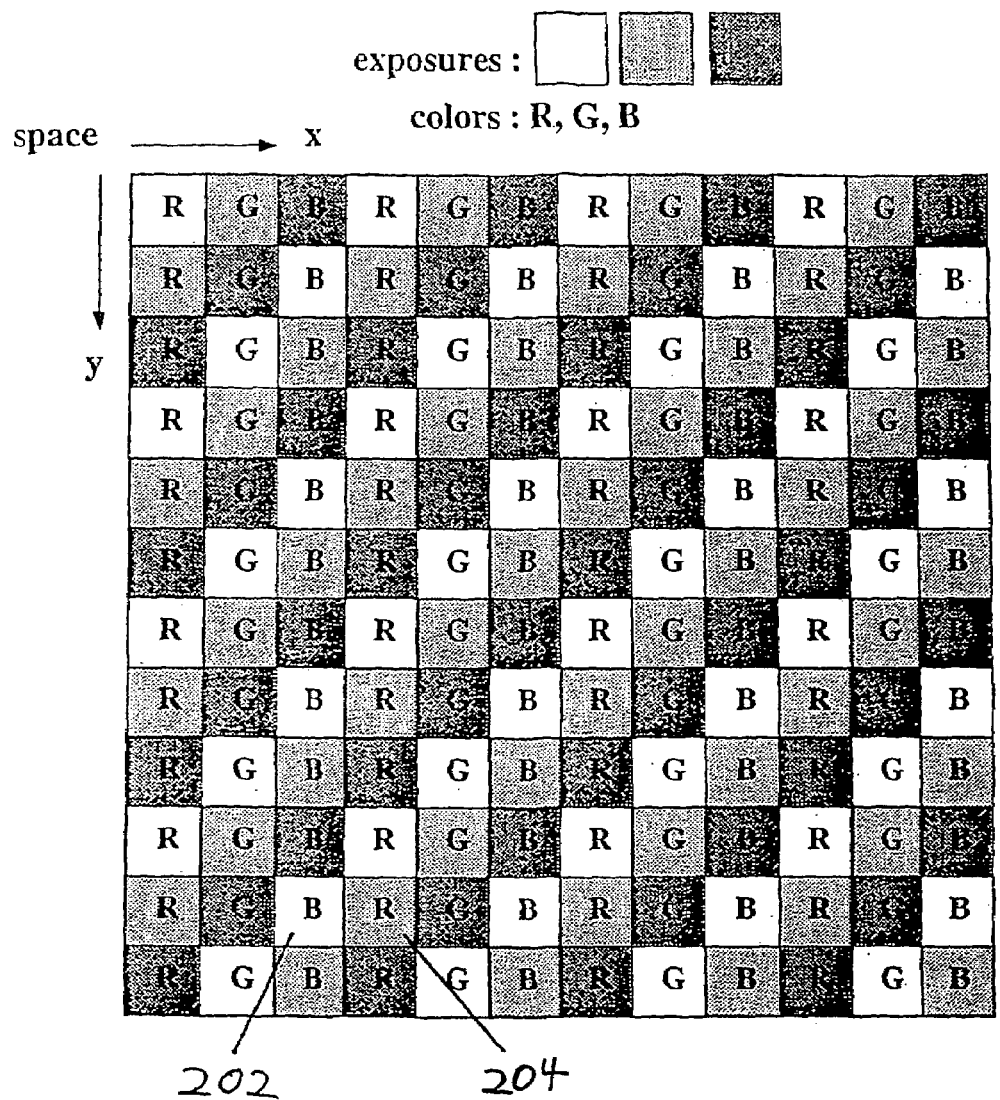
FIG. 2 is a diagram illustrating an exemplary detector sensitivity pattern in accordance with the present invention.

It should be noted that in some cases, a structural model may not yield optimal results if it uses the same coefficients regardless of which pixel is being enhanced. This is particularly likely when multiple attributes of the scene are sampled simultaneously. Such an example is illustrated in FIG. 2. Examination of the illustrated measurement pattern reveals that different pixels on the grid can have different local sampling patterns. For example, with reference to FIG. 2, suppose that an algorithm in accordance with the present invention is being used to obtain high quality R, G, and B values in the neighborhoods of a first pixel 202 and a second, neighboring pixel 204. The local pattern of exposures and spectral filters around the first pixel 202 is likely to be different from the patterns around the neighboring pixel 204. Therefore, inaccurate results may be produced if a single, uniform structural model—i.e., a model which ignores the sensitivity pattern of the surrounding neighborhood pixels— is used to predict the brightness of the image at every pixel in every one of the three illustrated color channels, unless the model has a large number of model coefficients. In order to obtain a model which is both "compact" (i.e., having a small number of coefficients) and effective, it is preferable not to use a single set of coefficients to accommodate data captured using a variety of local sampling patterns. Better results can be achieved by using a different set of model coefficients for each type of local sampling pattern. Because image values are typically sampled using a single repeated pattern, there is typically a small number of resulting sampling patterns. Accordingly, only a small number of structural models (or model components) is usually needed. Given a particular pixel of interest, the appropriate structural model is applied to the particular sampling pattern which occurs in the local neighborhood of that particular pixel.

Most digital color sensors use a single detector array to capture images. Each of the detectors in the array corresponds to an image pixel which measures the intensity of incoming light within a particular wavelength range—for example, red, green or blue. In other words, color filters are spatially interleaved on the detector array. Such a color mosaic can be referred to as a spatially varying color (SVC) mosaic. Various patterns of color filters can be overlaid on sensor arrays. An algorithm in accordance with the present invention can generate high quality color images using trained local polynomial mapping functions. It is to be noted that although the color mosaic methods of the present invention are described herein primarily with respect to single-chip, color CCD cameras, the methods of the invention are in no way restricted to any particular color sensor.

The color filters on the detector array of a single-chip CCD camera can be arranged in a variety of ways. A region around each pixel can be referred to as a "neighborhood." Every neighborhood contains a spatially varying pattern of colors which can be referred to as a "local pattern." A whole-image mosaic is created by replicating local patterns over the entire detector array. In some cases, the local patterns can be arranged in an overlapping manner.

Figure 10:
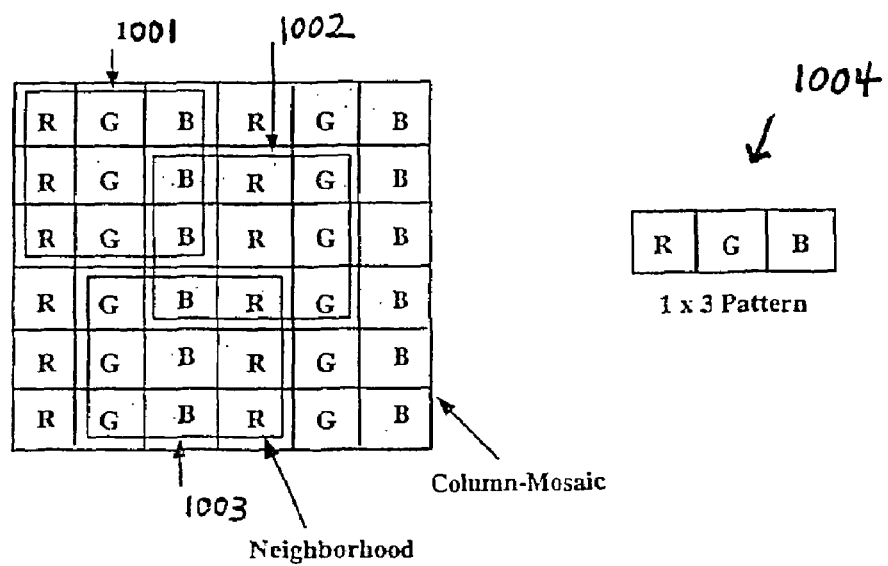
FIG. 10 is a diagram illustrating an exemplary detector sensitivity pattern in accordance with the present invention.

The above concepts can be illustrated with reference to two simple mosaics which are widely used in the digital camera industry. The first type, illustrated in FIG. 10, is commonly referred to as the Column-Mosaic. This type of mosaic is a uniform, column-by-column interleaving of the red, green, and blue channels—labeled in FIG. 10 as R, G, and B. In order to form the mosaic, a 1×3 pattern 1004 of R, G, and B sensitivities is repeated over the entire pixel array. In the exemplary mosaic illustrated in FIG. 10, the relative spatial resolution of each of the R, G, and B channels is 33%. Now consider the neighborhoods 1001, 1002, and 1003 in FIG. 10. Any other neighborhood of similar size and shape must correspond to one of the local patterns 1001, 1002, or 1003, because these are the only local, 3×3 neighborhood patterns which are possible for the exemplary column-mosaic illustrated in FIG. 10. In general, a 3-color column-mosaic CCD has only 3 distinct local neighborhood patterns, regardless of the shapes and sizes of the neighborhoods.

Figure 11:
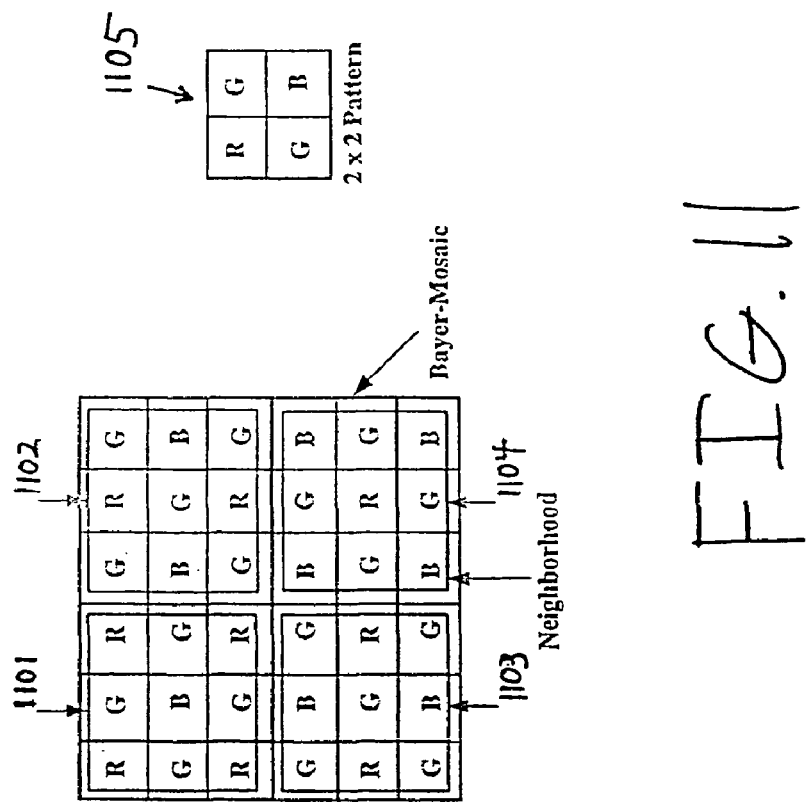
FIG. 11 is a diagram illustrating an additional exemplary detector sensitivity pattern in accordance with the present invention.
Figure 12:
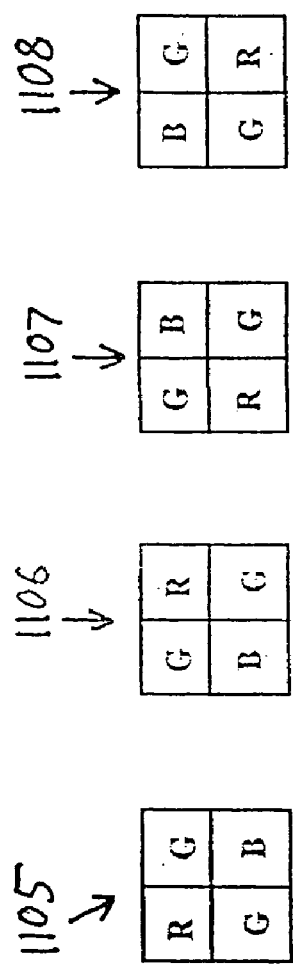
FIG. 12 is a diagram illustrating a further exemplary detector sensitivity patterns in accordance with the present invention.

A more popular type of mosaic, commonly referred to as the Bayer-mosaic, takes into account the sensitivity of the human visual system to different colors. It is well known that the human eye is more sensitive to green light than it is to red or blue light. Accordingly, the Bayer-mosaic sets the relative spatial resolution of green pixels to 50%, and that of red and blue pixels to 25%, thereby producing an image which appears less grainy to the human eye. An example of such a mosaic is illustrated in FIG. 11. The illustrated mosaic comprises a 2×2 pattern 1105 which is repeated over the entire image. The different types of local patterns in various neighborhoods correspond to the distinct cyclic shifts of the rows and columns of the 2×2 pattern, as illustrated in FIG. 11. Thus, in a Bayer-mosaic CCD, all neighborhoods of size≧2×2 can be classified as belonging to one of the four different possible local patterns. These four patterns 1105–1108 are illustrated in FIG. 12. In FIG. 11, patterns 1101–1104 are examples of 3×3 neighborhoods that represent the four different types of local patterns which are possible in Bayer-mosaic CCDs. In a preferred embodiment of the present invention, a Bayer mosaic is used, but the technique is also effective for column mosaic patterns or any other type of pattern.

In some conventional systems, interpolation is used to compute R, G, and B values which are not present in an image captured by a single-chip CCD. The interpolation is performed separately for each color channel. However, such a method fails to account for correlations between the colors of neighboring scene points; such correlations tend to occur in real scenes. In contrast, a method in accordance with the present invention develops local functions which exploit real scene correlations not only in spatial dimensions, but also in other dimensions such as wavelength and/or time. Using such local functions, the Bayer-mosaic input can be mapped into a high quality RGB image.

Figure 13:
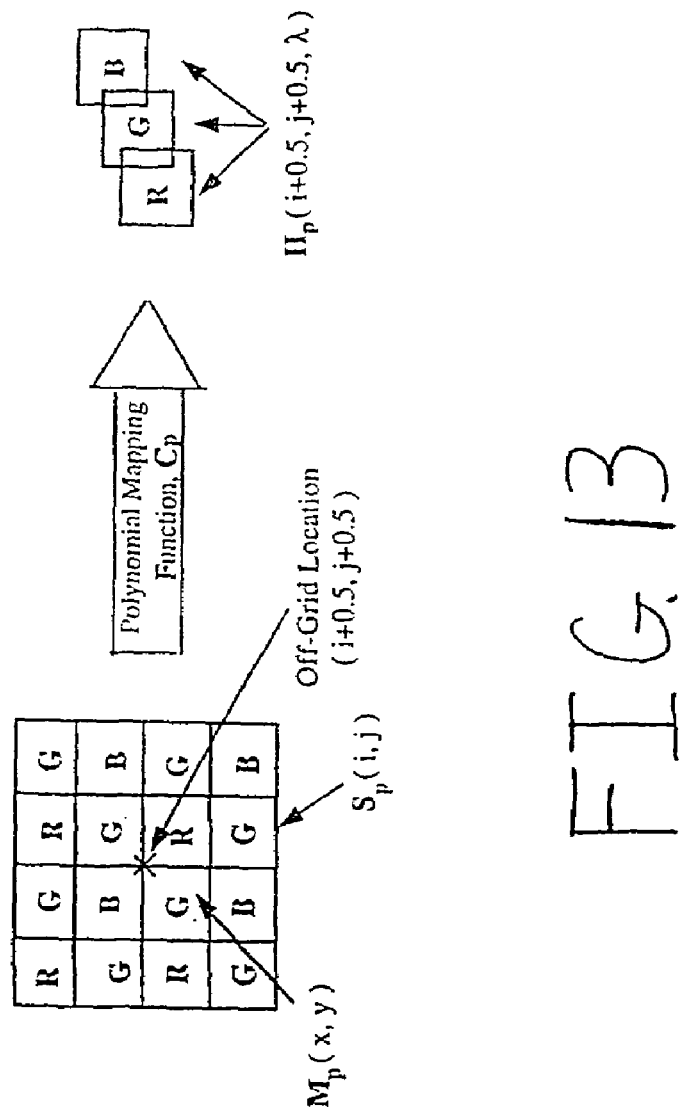
FIG. 13 is a block diagram illustrating the processing of data by an exemplary polynomial mapping function in accordance with the present invention.

Let the measured SVC data (e.g., data captured by a Bayer CCD) be represented by M. The desired high quality RGB image H can be reconstructed from M using a set of (typically 12) structural models (or mapping functions), one for each possible combination of a color channel λ with each of the four unique local patterns of neighborhoods. Let $M_p$ denote a neighborhood of M which belongs to a particular local pattern p. Then the desired color values at the neighborhood center can be estimated as:

$$H_p(i+0.5, j+0.5, \lambda) = \tag{10}$$

$$\sum_{(x,y)\in S_p(i,j)} \sum_{(k\neq x, l\neq y)\in S_p(i,j)} \sum_{n=0}^{N_p} \sum_{q=0}^{N_p-n} C_p(x, y, k, l, \lambda, n) M_p^n(x, y) M_p^q(k, l),$$

where $S_p(i,j)$ is the neighborhood of pixel (i,j) (see FIG. 13). $N_p$ is the order of the polynomial mapping. $C_p$ represents the set of polynomial coefficients of the local pattern p, for each color channel λ. Typically, information from pixels which are displaced, in the vertical direction, from pixel (i,j) is expected to be no more or less important than information from pixels which are displaced in the horizontal direction. Accordingly, it is generally preferable to use neighborhoods which are as wide as they are long—e.g., square neighborhoods. Furthermore, every wavelength sensitivity characteristic (e.g., every color) should preferably occur the same number of times in each neighborhood. For any even number of colors, or for a mosaic pattern having an even number of pixels, this condition is satisfied by a neighborhood having even (rather than odd) length and width. The R, G, and B values are computed at the off-grid neighborhood center (i+0.5, j+0.5).

The product $M_p(x, y) M_p(k, l)$ explicitly signifies the correlation between two pixels of the neighborhood. However, in many cases, using the product terms does not greatly add to the accuracy and efficiency of the technique, because scene radiances which are nearby (in spatial position or other dimensions) tend to be naturally correlated. A preferred mapping function is much simpler, and is given by:

$$H_p(i+0.5, j+0.5, \lambda) = \sum_{(x,y)\in S_p(i,j)} \sum_{n=0}^{N_p} C_p(x, y, \lambda, n) M_p^n(x, y). \tag{11}$$

In other words, a polynomial is computed for each on-grid pixel of a neighborhood within the low quality SVC data, and a high quality (i.e., high-resolution) color value is generated at the corresponding off-grid center pixel by aggregating (e.g., adding) the polynomials of all pixels in the neighborhood. It should be noted that in general, the above-described method can be used for neighborhoods of any size and shape, and can be used for off-grid as well as on-grid computation.

For each λ and each local pattern type p, the mapping function defined by Eq. (11), can be expressed in terms of matrices, as illustrated in FIG. 14:

$$B_p(\lambda) = A_p C_p(\lambda), \tag{12}$$

where each row of the matrix $A_p$ contains powers of the pixel values of a neighborhood $M_p$ which has a local pattern type p. Each row of $A_p$ contains pixel value powers up to polynomial order $N_p$. $C_p(\lambda)$ is a column vector containing the polynomial coefficients of each of the neighborhood pixels for color λ and local pattern p. $B_p(\lambda)$ is a column vector containing the desired off-grid neighborhood center values $H_p(\lambda)$ for each λ and p. The index λ can be dropped for brevity, and the estimation of the mapping functions can be posed as a weighted least squares problem:

$$A_p^T W_p^2 A_p C_p = A_p^T W_p^2 B_p, \quad (13)$$

where $W_p$ is a diagonal matrix which weights each of the neighborhood linear equations. In least squares terminology, $A_p^T W_p^2 A_p$ can be referred to as the "weighted normal matrix," and $A_p^T W_p^2 B_p$ can be referred to as the "weighted regression vector."

The number of coefficients in the mapping function of Eq. (11) can be calculated as follows. Let u×v represent the neighborhood size, and let $N_p$ represent the polynomial order corresponding to pattern p. Let P represent the number of distinct local patterns in the SVC image. Let Λ represent the number of color channels. Then, the number of coefficients |C|, is given by the following equation:

$$|C| = \left(P + uv \sum_{p=1}^{P} N_p\right) \Lambda. \quad (14)$$

For example, when P=4 (e.g., for Bayer-mosaic CCDs), $N_p$=2 for p=1 . . . P, u=v=6 (i.e., a square neighborhood having even length and width), and Λ=3 (R, G, and B), the number of coefficients is 876. For image reconstruction, the large number of coefficients provides much greater flexibility than conventional interpolation techniques.

An algorithm in accordance with the invention can "learn" (i.e., optimize) the parameters of the local polynomial mapping function, using several high quality RGB images. The optimized mapping function enables reconstruction of high quality color images from images captured using Bayer-mosaic CCDs which provide only one color channel measurement at every pixel.

Figure 15:
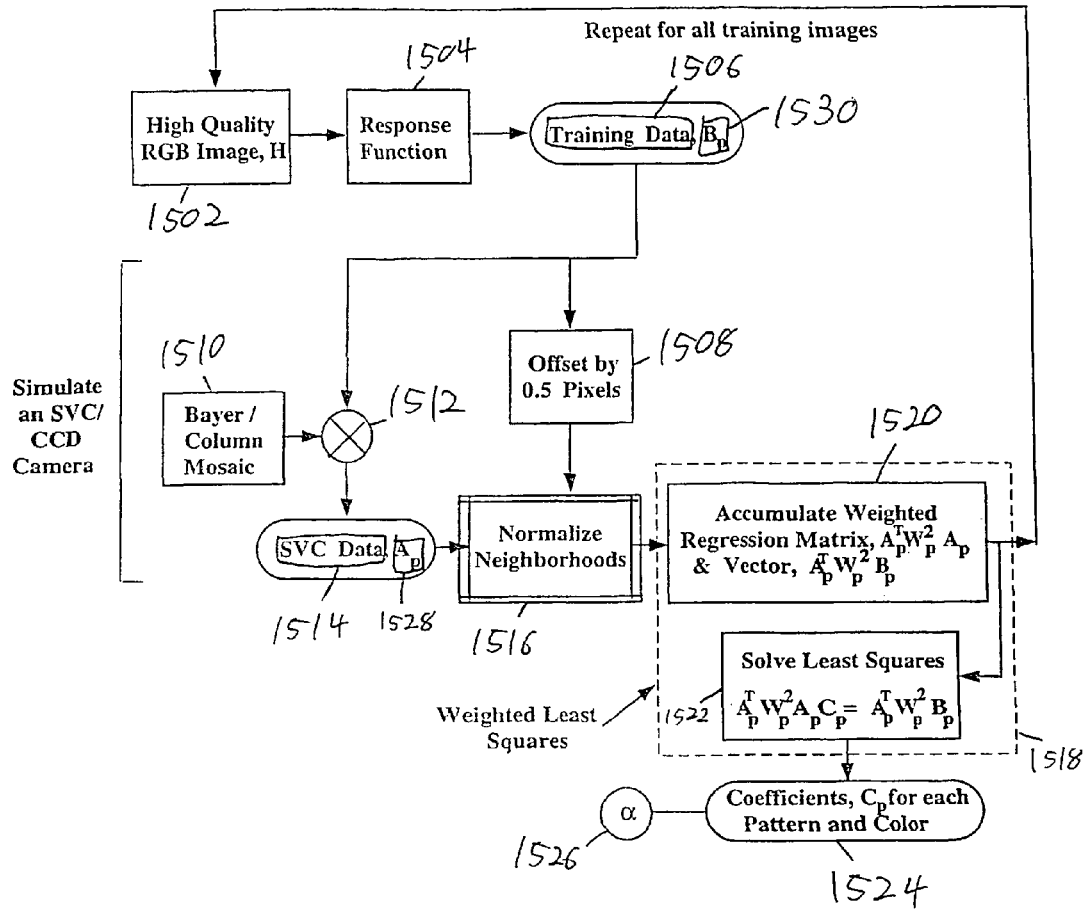
FIG. 15 is a flow diagram illustrating an additional exemplary procedure for enhancing data resolution in accordance with the present invention.

In the training stage, a training algorithm estimates the coefficients of the local polynomial mapping functions for each type of local pattern, and for each color channel, using high quality RGB images. FIG. 15 illustrates a flow chart of an exemplary training stage in accordance with the invention. The training algorithm in the illustrated example starts with high quality color images 1502 captured using a film camera and scanned using a slide scanner. In order to degrade the images to simulate images captured by an actual CCD array, the training images 1506 are generated by processing the high quality images 1502 through a response function 1504 which simulates the performance and limitations of a typical CCD array. Next, an SVC image M (item 1514 in FIG. 15)—which can be, e.g., a Bayer-Mosaic image—is simulated by deleting the appropriate color channel values from the high quality images 1502 in accordance with a color mosaic pattern 1510 (step 1512). From the simulated SVC image M (item 1514), the algorithm extracts a set of neighborhoods $A_p$ (item 1528) for each pattern p, as illustrated in FIG. 14. Each neighborhood has a local pattern type p (e.g., see patterns 1101–1104 in FIG. 11). Similarly, for each color channel, the column vector $B_p$ (item 1530) is extracted from the training image H (item 1502). In order to ensure that the red and blue pixels in the neighborhood are represented in the same proportions as in the basic Bayer pattern, it is preferable to use neighborhoods having even (rather than odd) length and width. The center of a neighborhood having an even length and/or width is at an off-grid location, as illustrated in FIG. 13. In order to compensate for the resulting, half-pixel offset, the algorithm offsets the training images 1506 by a half-pixel (step 1508). If the original sampling of the high quality images did not adhere to Nyquist's criteria for signal reconstruction, the half-pixel offset can introduce further blurring into the training images. Such blurring can result in model coefficients which are better optimized for blurry input images and/or scenes with predominantly smooth surfaces. If it is desired to optimize the model for sharp images of scenes with predominantly sharp and abrupt features, it is preferable to start with an image which has been sampled in conformance with Nyquist's criteria, and which represents a scene having predominantly sharp and abrupt features. However, as discussed above with respect to the SVE algorithm, if at the time of training, there is no way to know the level of sharpness of the images which will later be enhanced by the algorithm, it is preferable to use sharp images for training, because the accuracy of the model will be most important for enhancing sharper images, and in any case, the sharp training images are likely to include enough smooth area to also enable enhancement of smooth and/or blurry images.

The algorithm normalizes each neighborhood $A_p(i)$ in the SVC data (step 1516), as discussed above with respect to the SVE algorithm. After normalization, a weighted least squares procedure (step 1518) is used to compute the weighted normal matrix $A_{pnorm}^T W_p^2 A_{pnorm}$ and right hand side regression vector $A_{pnorm}^T W_p^2 B_{pnorm}$. In the least square procedure 1518, for each training image, the weighted normal matrix and the weighted regression vector are additively accumulated (step 1520). The least squares results are then computed (step 1518). Once all of the training images have been processed, the algorithm uses Eq. (13) to determine the coefficients $C_p$ (item 1526) of the polynomial mapping function for each type of neighborhood pattern p, and for each color channel (step 1524).

Figure 16:
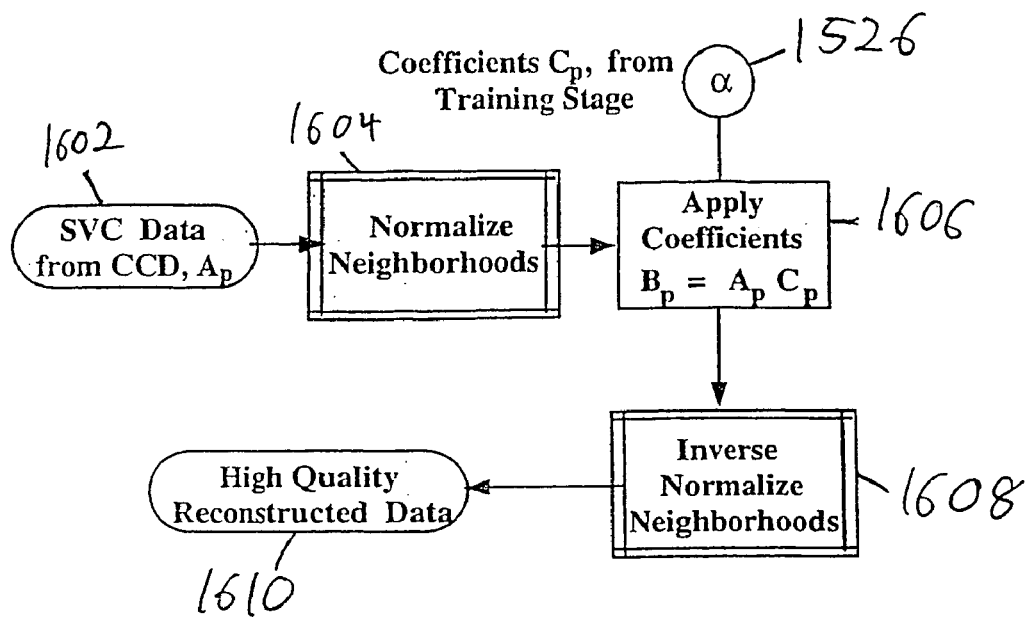
FIG. 16 is a flow diagram illustrating yet another exemplary procedure for enhancing data resolution in accordance with the present invention.

In the reconstruction stage—an example of which is illustrated in FIG. 16—a reconstruction algorithm applies the polynomial coefficients 1526—which were computed in the training stage—to SVC images 1602 captured using Bayer-mosaic CCDs. In other words, the algorithm computes a high quality image 1610 having three color channel values per pixel, from an SVC image having only one color channel measurement per pixel. This reconstruction can be referred to as "demosaicing." Similarly to the training stage, in the reconstruction stage each neighborhood of the SVC image is normalized (step 1604). The coefficients $C_p$ (step 1526) are then applied to each of the normalized neighborhood patterns, and to each color channel, to thereby obtain $B_{pnorm} = A_{pnorm} C_p$ (step 1606). $B_{pnorm}$ is then inverse-normalized (i.e., unnormalized) (step 1608) to thereby obtain the reconstructed high quality color image 1610.

Figure 35:
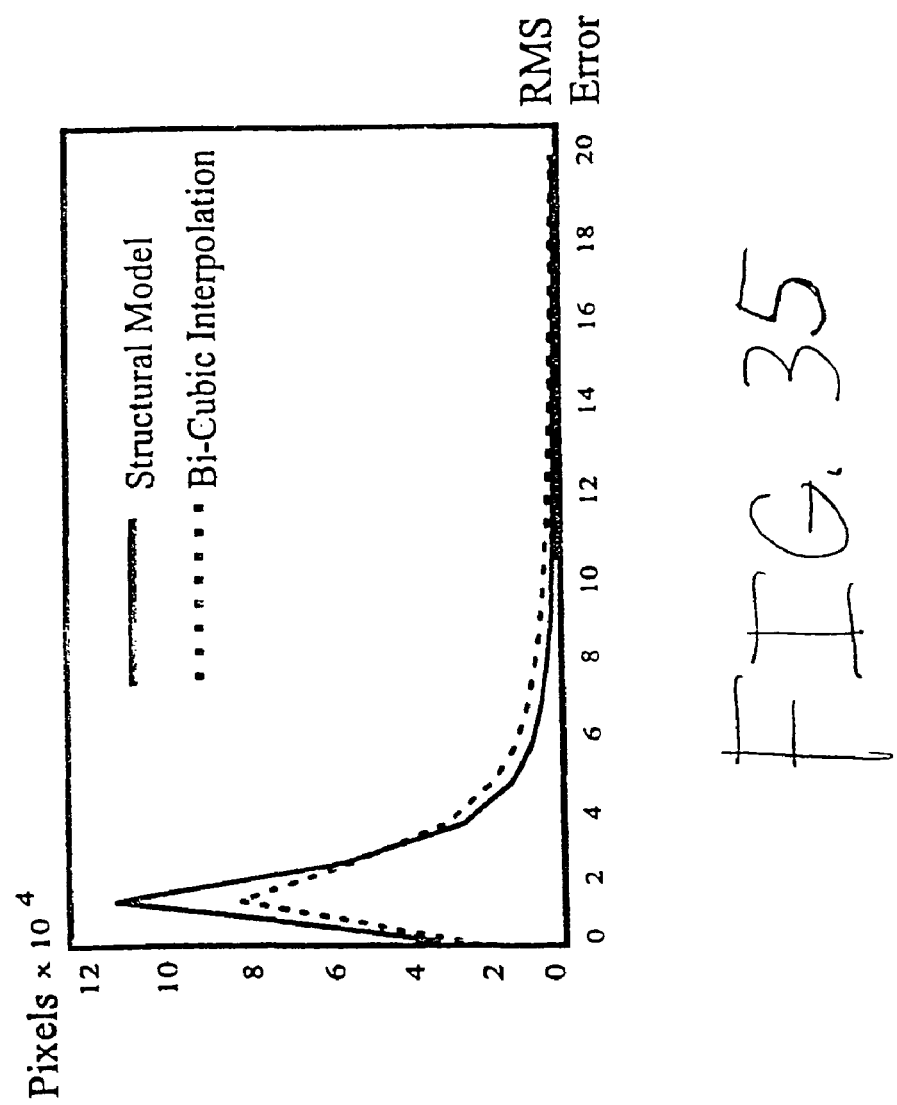
FIG. 35 is a graph illustrating the level of performance of another exemplary procedure for enhancing data resolution in accordance with the present invention.

An SVC training algorithm in accordance with the invention has been tested using 30 high quality color images representing a wide variety of natural scenes. Each of the training images was downgraded by deleting two color channels from each pixel to thereby obtain SVC images, as illustrated in the flow chart of FIG. 15. The coefficients of a local polynomial mapping function of order 2 were then computed using a weighted least squares procedure. Next, 20 test images—which were different from the images used in the training step—were downgraded in order to generate 20 simulated, low quality SVC images. The model coefficients were applied to the simulated low quality test images, in accordance with the flow chart of FIG. 16. As illustrated by the histogram graph of FIG. 35, the structural reconstruction method of the present invention produced more low-error pixels, and fewer high-error pixels, than conventional cubic interpolation.

Figure 5:
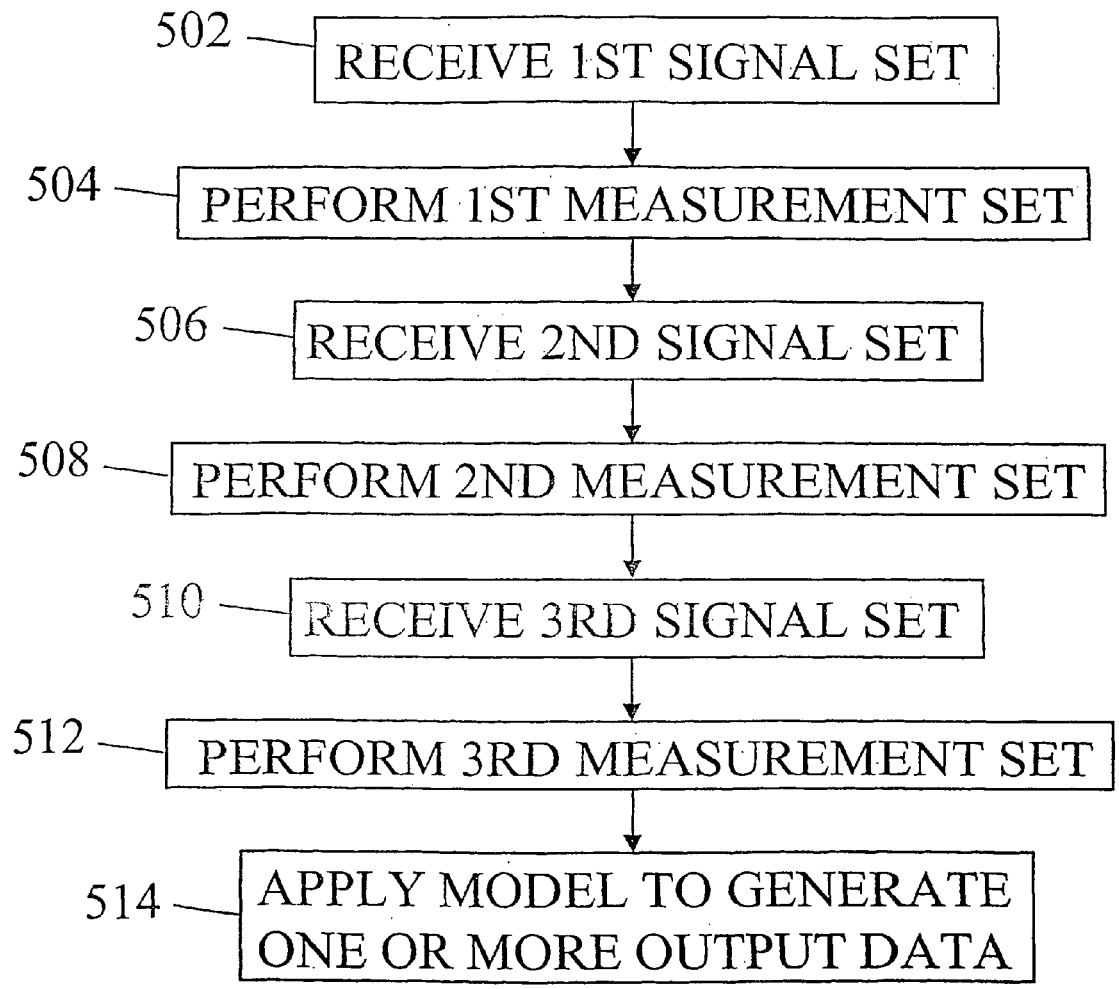
FIG. 5 is a flow diagram illustrating a further exemplary procedure for enhancing data resolution in accordance with the present invention.
Figure 6A:
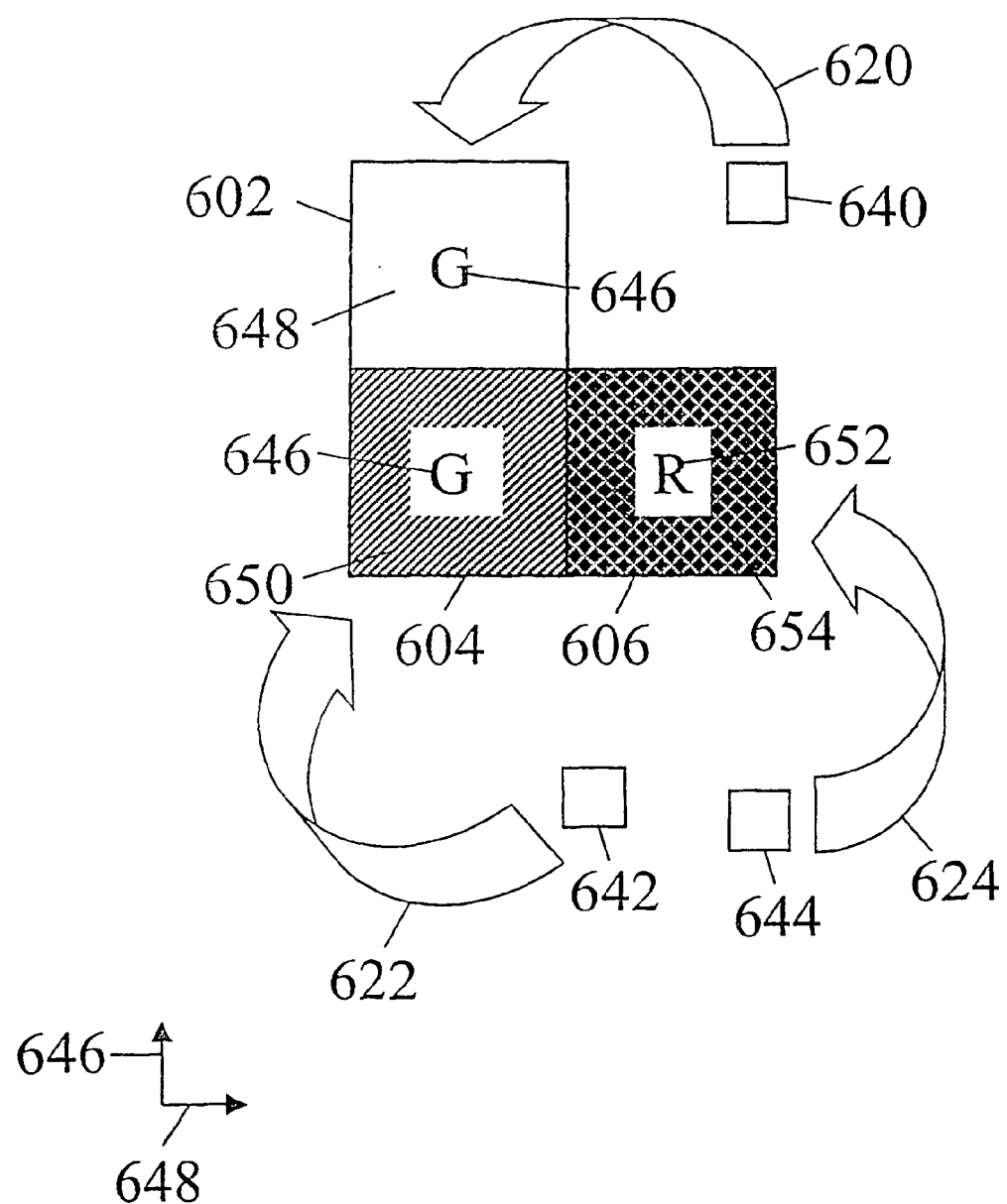
FIG. 6A is a diagram illustrating the use of an exemplary detector sensitivity pattern in accordance with the present invention.

In accordance with a preferred embodiment of the present invention, a locally inhomogeneous measurement pattern can comprise a combination of locally inhomogeneous patterns of different types of sensitivity characteristics. For example, as illustrated in FIG. 6A, a measurement pattern can be a combination of an intensity sensitivity pattern and a wavelength (e.g., color) sensitivity pattern. Such a pattern, which constitutes a combination of an SVE pattern and an SVC pattern, can be referred to as a spatially varying color and exposure (SVEC) pattern. In the example illustrated in FIG. 6A, the measurement pattern comprises three sensor regions 602, 604, and 606. FIG. 5 illustrates an exemplary procedure for measuring signals using the pattern of FIG. 6A. The first region 602 receives, from the region 640 of an object 126 in the scene (see FIG. 1), a first signal set 620 which includes one or more signals (step 502 in FIG. 5).

The first sensor portion 602 performs a first measurement set (comprising at least one measurement) of the first signal set 620 (step 504 in FIG. 5). In the measurement pattern illustrated in FIG. 6A, the first region 602 has a first sensitivity characteristic 646 comprising a sensitivity to green light. In addition, the first sensor region 602 has a second sensitivity characteristic 648 comprising a high sensitivity to light intensity.

The second detector set 604 receives and measures a second signal set 622 from a second region 642 of the scene (steps 506 and 508). The second detector set 604 is also sensitive to green light—i.e., the sensor has the same first sensitivity characteristic 646 as the first detector set 602. In addition, the second detector set 604 has a third sensitivity characteristic with respect to the second signal set 622, the third sensitivity characteristic 650 comprising a somewhat reduced sensitivity to light intensity. The third detector set 606 receives and measures a third signal set 624 from a third region 644 of the scene (steps 510 and 512). The third detector set 606 has a fourth sensitivity characteristic 652 with respect to the third signal set 624. In this example, the fourth sensitivity characteristic 652 has the same type as the first sensitivity characteristic 646—i.e., a sensitivity to a selected set of wavelengths (in this case, red light). Furthermore, in the example illustrated in FIG. 6A, the third detector set 606 has a first sensitivity characteristic 654 comprising an even further reduced sensitivity to light intensity. The fifth sensitivity characteristic 654 is of the same type as the second and third sensitivity characteristics 648 and 650 of the first and second detector sets 602 and 604, respectively—i.e., a particular level of sensitivity to light intensity. Once the first, second, and third signal sets have been measured, a structural model in accordance with the invention is used to enhance the resolution of the resulting data, thereby producing higher resolution output data (step 514 in FIG. 5).

Figure 6B:
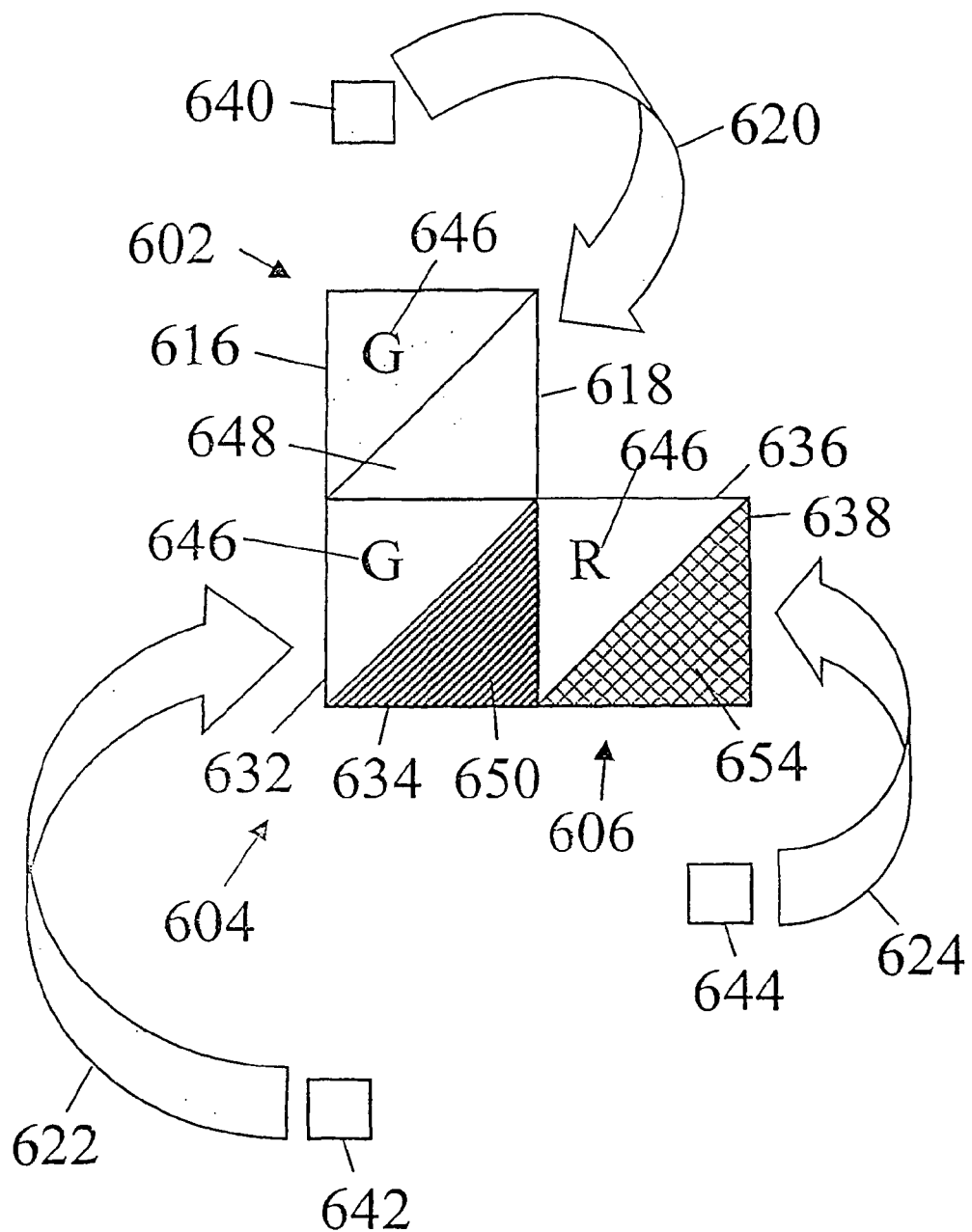
FIG. 6B is a diagram illustrating the use of an additional exemplary detector sensitivity pattern in accordance with the present invention.
Figure 6D:
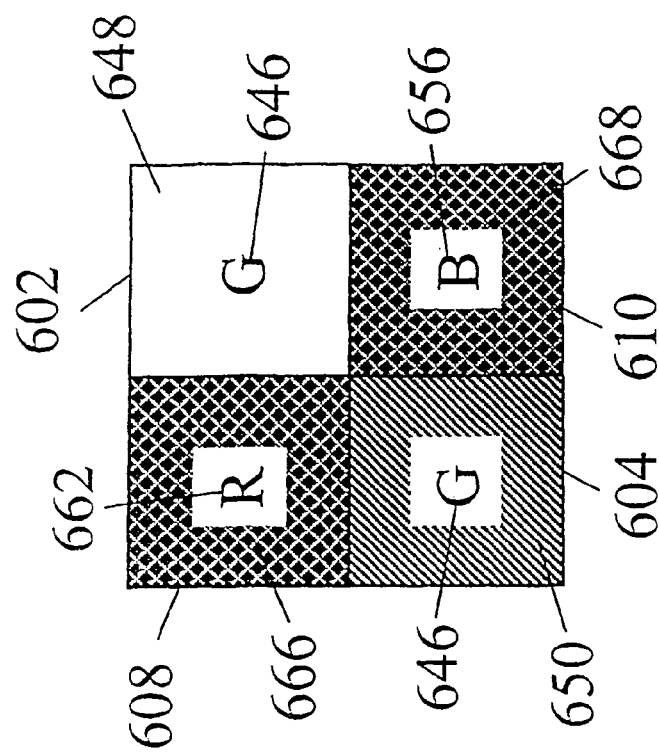
FIG. 6D is a diagram illustrating a further exemplary detector sensitivity pattern in accordance with the present invention.
Figure 6C:
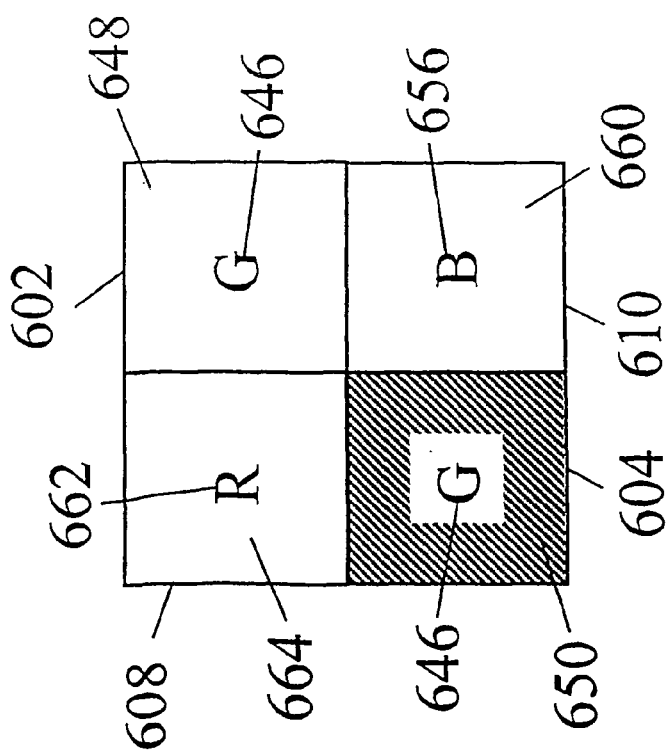
FIG. 6C is a diagram illustrating an exemplary detector sensitivity pattern in accordance with the present invention.

In accordance with an additional embodiment of a locally inhomogeneous measurement pattern in accordance with the invention, detector sets need not be formed by overlapping masks, but instead can be formed from multiple detectors, each detector having its own sensitivity characteristic, as illustrated in FIG. 6B. In the illustrated measurement pattern, the first detector set comprises a detector 616 having a sensitivity characteristic 646 which has a type of dependence of measurement sensitivity with respect to signal wavelength—i.e., the detector 616 is sensitive to green light. The first detector set also includes a detector 618 having a sensitivity characteristic 648 which has a type of dependence of measurement output with respect to signal intensity—i.e., in this case, the detector 618 has unreduced intensity sensitivity. The second detector set 604 similarly includes two detectors 632 and 634 having sensitivity characteristics 646 and 650 of a color sensitivity type and an intensity sensitivity type, respectively. Similarly, the third detector set 606 also includes detectors 636 and 638 which have sensitivity characteristics 646 and 654 of a color sensitivity type and an intensity sensitivity type, respectively. Although the measurement patterns illustrated in FIGS. 6A and 6B include only three detector sets, there is no limit to the number of detector sets that can be used as part of the measurement pattern. For example, as illustrated in FIGS. 6C and 6D, in a preferred embodiment of a locally inhomogeneous measurement pattern in accordance with the present invention, a Bayer pattern can be used in conjunction with a locally inhomogeneous pattern of intensity sensitivity characteristics. In the example illustrated in FIG. 6C, four detector sets 608, 602, 610, and 604 have various color sensitivity characteristics 662, 646, 656 and 646, respectively. In addition, the detector sets 608, 602, 610, and 604 have various intensity sensitivity characteristics 664, 648, 660, and 650, respectively. In addition, as illustrated in FIG. 6D, different intensity sensitivity characteristic patterns can be used. For example, in the example illustrated in FIG. 6C, the red and blue detector sets 608 and 610 have intensity sensitivity characteristics 664 and 660 corresponding to high sensitivity to light intensity. However, in the example illustrated in FIG. 6D, the red and blue detector sets 608 and 610 have intensity sensitivity characteristics 666 and 668 which correspond to reduced sensitivity to light intensity.

Figure 22:
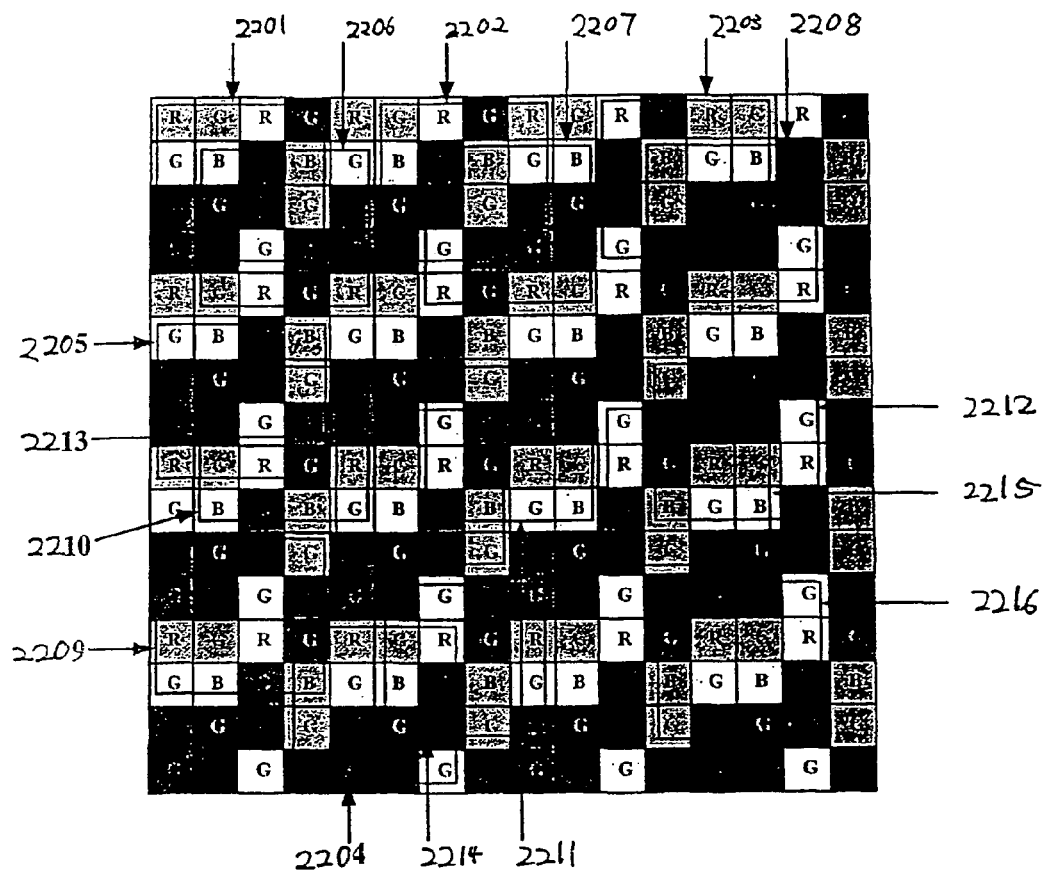
FIG. 22 is a diagram illustrating an exemplary detector sensitivity pattern in accordance with the present invention.

A basic SVEC pattern can be used to create a whole-image SVEC pattern. Consider, for example, the array of pixels illustrated in FIG. 22. The gray levels indicate pixel exposures, and the capital letters R, G, and B indicate the color channels measured at the various pixels. One way to create such a whole-image SVEC mosaic is by assigning color sensitivities and brightness (i.e., intensity) sensitivities within a small neighborhood to form an initial pattern, and then repeating the initial pattern over the entire detector array. In the example illustrated in FIG. 22, a square, 4×4 initial pattern 2201 is repeated over the entire detector array. However, in general, the initial pattern can be an arbitrarily-sized mosaic of colors and exposures. An advantage of repeating such an initial pattern throughout the detector array is that the number of distinct types of local patterns 2201–2216 corresponds to the distinct cyclic shifts of the initial pattern 2201. In SVEC imaging, color and dynamic range are simultaneously sampled as a function of spatial position; as a result, the local patterns within the SVEC mosaic are more complicated than the local patterns in either the SVC mosaic or the SVE mosaic.

The various exposures and colors are preferably assigned to the respective pixels in a manner which produces an SVEC mosaic having certain desired properties which depend upon the particular application. The desired properties can be defined in terms of the following parameters:

1. Neighborhood size and shape defined according to length u, width v, and/or aspect ratio $$a = \frac{v}{u}.$$

2. Number of R, G and B regions in any neighborhood, and the relative positions of the respective color-sensitive regions.

3. Number e of different exposures (i.e., intensity sensitivities) and the values and relative positions of the respective exposure sensitivity regions within the neighborhoods.
4. Number of R, G and B regions assigned to each exposure value.

For example, as discussed above, in most cases the neighborhood length and width are preferably equal (i.e., a=1). With regard to size, smaller neighborhoods tend to provide better results for images having "smaller" texture— i.e., in which brightness changes rapidly per unit distance. This is because for such images, correlations among more distant pixels are attenuated, and as a result, a large neighborhood does not provide much more information than a small neighborhood. In addition, as discussed above, for a mosaic having an even number of elements, the neighborhood should preferably have even length and even width.

With regard to the number e of exposure levels, a higher number can provide higher dynamic range. With regard to the ratios among the different exposure levels, higher ratios provide more total detectable range, but result in a coarser spacing of detectable brightness levels. Preferably, the ratios of the exposure levels should be chosen so that the total range of detectable brightness matches the range of brightness levels which are present in the scene and are of interest.

The various exposure levels are preferably distributed to avoid placing most of the high sensitivity pixels in one portion of the neighborhood (e.g., the upper right corner), and most of the low sensitivity pixels in a different portion (e.g., the lower left corner). Such a preferred arrangement increases the likelihood that at least some pixels in every portion of the neighborhood will detect an incoming signal accurately, even if adjacent or nearby pixels are either saturated or unable to detect the signal.

With regard to color patterns, in many systems, a Bayer mosaic (illustrated in FIG. 11) is the preferred choice for color distribution on the detector array, because such a pattern matches the sensitivity of the human eye, and also because most digital cameras follow this pattern. If such a pattern is used, then within each local neighborhood of size u×v, the spatial resolutions of R, G, and B are 25%, 50%, and 25% respectively, as illustrated in FIG. 11:

$$|R|=|B|=0.25 \ uv;$$

$$|G|=0.5 \ uv \qquad (15)$$

Based on Eq. (15), and upon the Bayer pattern, it can readily seen that the neighborhood length u and the neighborhood width v are both even. Furthermore, within each neighborhood, for each different exposure level each color should preferably occur the same number of times as the color occurs in the Bayer pattern. Therefore:

$$|R|=|B|=ke;$$

$$|G|=2ke,$$

$$4ke=uv, \qquad (16)$$

where R and B are combined with each exposure k times, G is combined with each exposure 2k times, and k, e, and u are positive integers. Furthermore, in terms of the aspect ratio a of the neighborhood:

$$4ke=au^2. \qquad (17)$$

In order to minimize the number of coefficients needed for the model, it is preferable to find the smallest local SVEC pattern that satisfies the above constraints. For a fixed number e of exposures and a fixed aspect ratio a, the minimum size u of the local pattern corresponds to the smallest integer value for k that satisfies Eq. (17). For example, if e=2, and a=1 (i.e., the neighborhoods are square), the smallest neighborhood that needs to be repeated over the entire detector array has a size u=4 (corresponding to k=2). Similarly, for e=4 and a=1, the resulting parameters are: u=4 and k=1. The exemplary image pattern illustrated in FIG. 22 uses e=4 (i.e., four different gray levels) and a Bayer color mosaic. To produce the whole-image pattern, the 4×4 square neighborhood 2201 is repeated over the entire array.

The above results establish a relationship between the number of exposure sensitivity values and the preferred local neighborhood pattern size. In addition, the spatial arrangement of colors in each neighborhood has been determined. Using the above constraints, the various exposure sensitivity values can be assigned to the various pixels in the local patterns.

In a preferred embodiment of the present invention, a low dynamic range, Bayer-mosaic SVEC image is mapped to a high dynamic range color image using optimized local polynomial mapping functions. The mapping functions are derived from a learned structural model.

Figure 23:
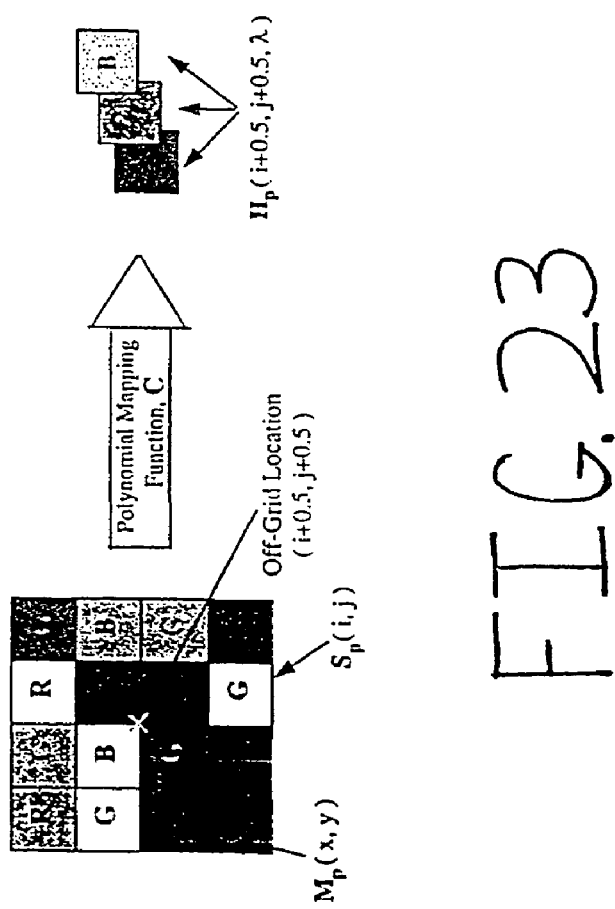
FIG. 23 is a block diagram illustrating the processing of input data using an exemplary polynomial mapping function in accordance with the present invention.

Let the measured data—in this example, data captured using an SVEC sensor—be represented by M. A high dynamic range color image H can be reconstructed from M using a set of structural models (i.e., local mapping functions). For each color channel λ, a local mapping function is optimized for each of the 16 types of local neighborhood patterns p—illustrated as patterns 2201–2216 in FIG. 22. Let $M_p$ denote a neighborhood of M that belongs to a particular local pattern p. Then, the desired high dynamic range color values at the neighborhood center can be estimated as:

$$H_p(i+0.5, j+0.5, \lambda) = \sum_{(x,y)\in S_p(i,j)} \sum_{n=0}^{N_p} C_p(x, y, \lambda, n) M_p^n(x, y), \qquad (18)$$

where $S_p$ (i, j) is the neighborhood of pixel (i, j), as illustrated in FIG. 23. $N_p$ is the order of the polynomial mapping. $C_p$ represents the polynomial coefficients of the pattern p at each of the neighborhood pixels (x, y), for each color channel λ. This exemplary implementation uses square neighborhoods having even length and even width. The high dynamic range color values are computed at the off-grid neighborhood center (i+0.5, j+0.5), as illustrated in FIG. 23. It is to be noted that the method can be used for any neighborhood size and shape, and can be used to compute image values in both off-grid and on-grid locations/regions (i.e., pixels). It is also to be noted that although a relatively simple mapping function—Eq. (18)—is used in this exemplary implementation, the algorithm can also employ a more general mapping function such as that of Eqs. (3) and (10), discussed above in the SVE and SVC contexts.

Similarly to the SVE and SVC procedures, Eq. (18) is expressed in terms of matrices for each local pattern p, as illustrated in FIG. 14:

$$B_p(\lambda)=A_p C_p(\lambda). \qquad (19)$$

where $A_p$ is a matrix each row of which contains powers of the pixel values of a neighborhood $M_p$ belonging to local pattern type p. $A_p$ contains pixel value powers up to polynomial order $N_p$. $C_p(\lambda)$ is a column vector containing the polynomial coefficients of each of the neighborhood pixels for color λ and local pattern type p. $B_p(λ)$ is a column vector representing the center color values $H_p(λ)$ of the desired high dynamic range off-grid neighborhoods for each λ and p. The index λ can be dropped for brevity, and the estimation of the mapping function can be posed as a weighted least squares problem:

$$A_p^T W_p^2 A_p C_p = A_p^T W_p^2 B_p. \quad (20)$$

where $W_p$ is a diagonal matrix that weights each of the neighborhood linear equations.

The number of coefficients in the polynomial mapping function can be calculated as follows. Let u×v represent the neighborhood size and shape, and let $N_p$ represent the polynomial order corresponding to local SVEC pattern p. Let P represent the number of distinct neighborhood patterns in the SVEC image. Then, the number of coefficients |C| is given by the following equation:

$$|C| = \left(P + uv \sum_{p=1}^{P} N_p\right) Λ. \quad (21)$$

For example, when Λ=3 (e.g., for the colors R, G, and B), P=16 (for SVEC detectors using 4 different pixel exposures and a Bayer color mosaic), $N_p$=2 for p=1 ... P, and u=v=6 (i.e., a square neighborhood having even length and width), the number of coefficients is 3504.

The model-based method for enhancing image quality in accordance with the present invention may be applied to any simultaneous sampling of the dimensions of image irradiance, as is demonstrated by the similarity among the mapping functions of Eqs. (4), (11), and (18), and also by the similarity among the descriptions of the SVC, SVE, and SVEC notation and methods.

Figure 24:
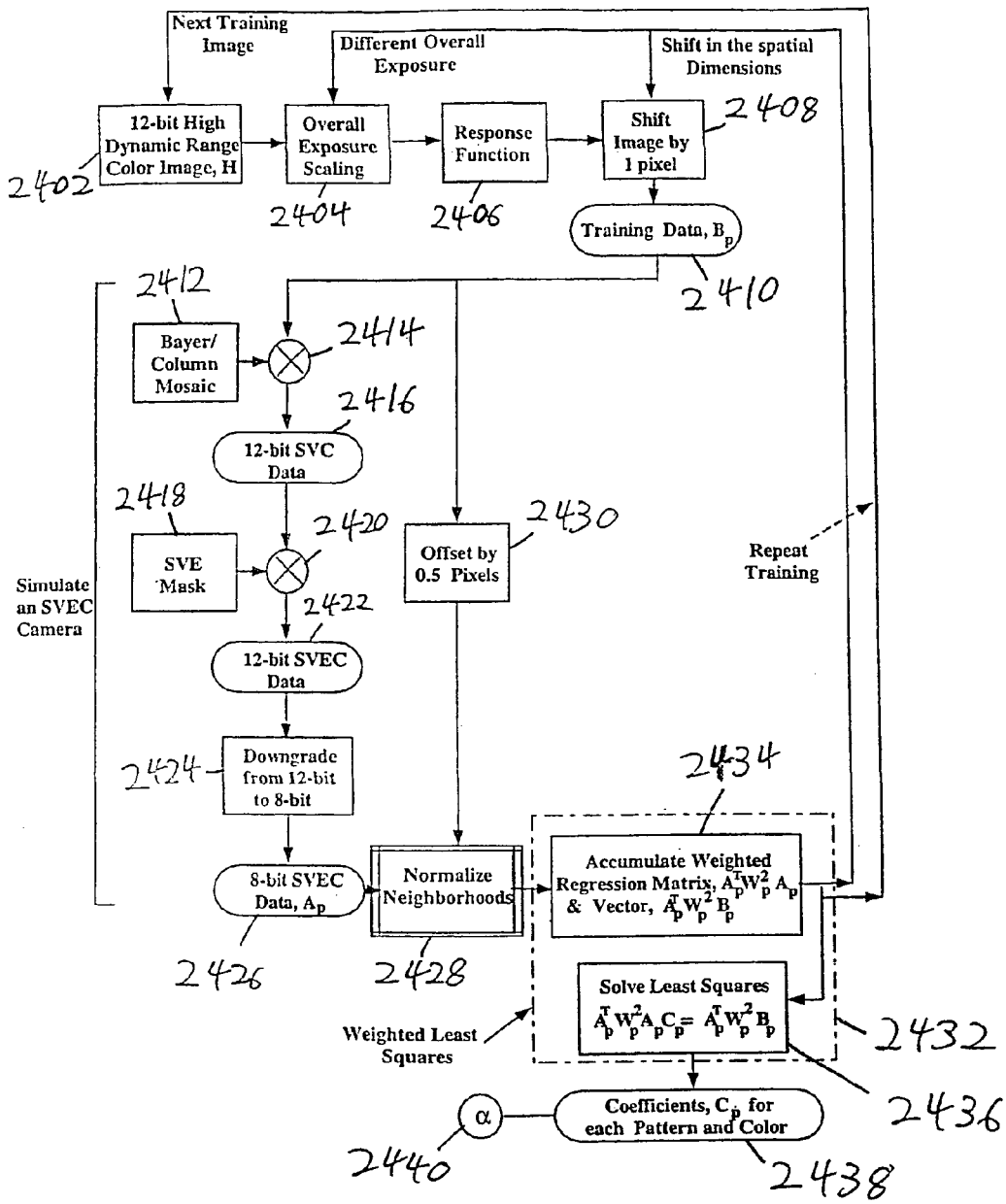
FIG. 24 is a flow diagram illustrating yet another exemplary procedure for enhancing data resolution in accordance with the present invention.

An SVEC algorithm in accordance with the present invention can learn a local polynomial mapping function using several images captured by high dynamic range color sensors. The resulting mapping function can then be used to reconstruct high dynamic range color images from other images captured by SVEC sensors. In the training stage of the algorithm, the coefficients of a local polynomial mapping function are estimated for each type of neighborhood pattern—(e.g., patterns 2201–2216 in FIG. 22—using high dynamic range color images. FIG. 24 illustrates a flow chart of an exemplary SVEC training stage in accordance with the invention. In the illustrated example, the training is performed using 12-bit color images 2402 which have been captured by a film camera and scanned by a slide scanner. The intensities of the respective images 2402 are scaled to simulate a change in the overall exposures of the images captured by the sensor (step 2404). The algorithm applies, to the scaled images, a response function 2406 matching that of an SVEC detector. The resulting images are then translationally shifted in order to train (i.e., optimize) the mapping function parameters using, preferably, every possible combination of each type of exposure pattern with each type of image neighborhood (step 2408). The output of the shifting step 2408 is a set of training images 2410. An SVC mask 2412 and an SVE mask 2418 are applied to each training image in order to generate a 12-bit SVEC image 2422 (steps 2416 and 2420). In the illustrated example, the SVC mask 2412 is applied first (step 2414), thereby generating SVC intermediate data 2416. However, the SVE mask can also be applied first. Each 12-bit SVEC image 2422 is downgraded by clipping the pixel data at an intensity level of 255 and then re-quantizing the data (step 2424) to generate an 8-bit image M (illustrated as item 2426). The above-described process simulates a low dynamic range SVEC sensor. From image M (item 2426), the set of neighborhoods $A_p$ is extracted for each pattern p, as illustrated in FIG. 14. For each color channel and local pattern, the column vector $B_p$ is extracted from the training image H. The illustrated implementation uses square neighborhoods having even length and width. Similarly to the SVC and SVE algorithms, in the SVEC algorithm, the training images are offset by one half of a pixel (step 2430). In addition, as discussed above with respect to the SVE and SVC algorithms, if at the time of training, there is no way to know the level of sharpness of the images which will later be enhanced by the algorithm, it is preferable to use sharp images for training, because the accuracy of the model will be most important for enhancing sharper images, and in any case, the sharp training images are likely to include enough smooth area to also enable enhancement of smooth and/or blurry images.

The data of each neighborhood belonging to one of the local SVEC pattern types is normalized using Eqs. (8) and (9), similarly to the SVE and SVC algorithms (step 2428). After normalization, a weighted least squares procedure 2432 is used to compute the weighted normal matrix $A_{pnorm}^T W_p^2 A_{pnorm}$ and the right hand side regression vector $A_{pnorm}^T W_p^2 B_{pnorm}$. In the least squares procedure 2432, for each training image, the normal matrix and the regression vector are each additively accumulated (step 2434). Once the training algorithm has processed all of the high dynamic range color images—including multiple exposures and multiple translational shifts for each image—the least squares result is obtained (step 2436) and used to compute the coefficients $C_p$ (item 2440) of the polynomial mapping function for each type of neighborhood pattern p and for each color channel λ, using Eq. (20) (step 2438).

Figure 25:
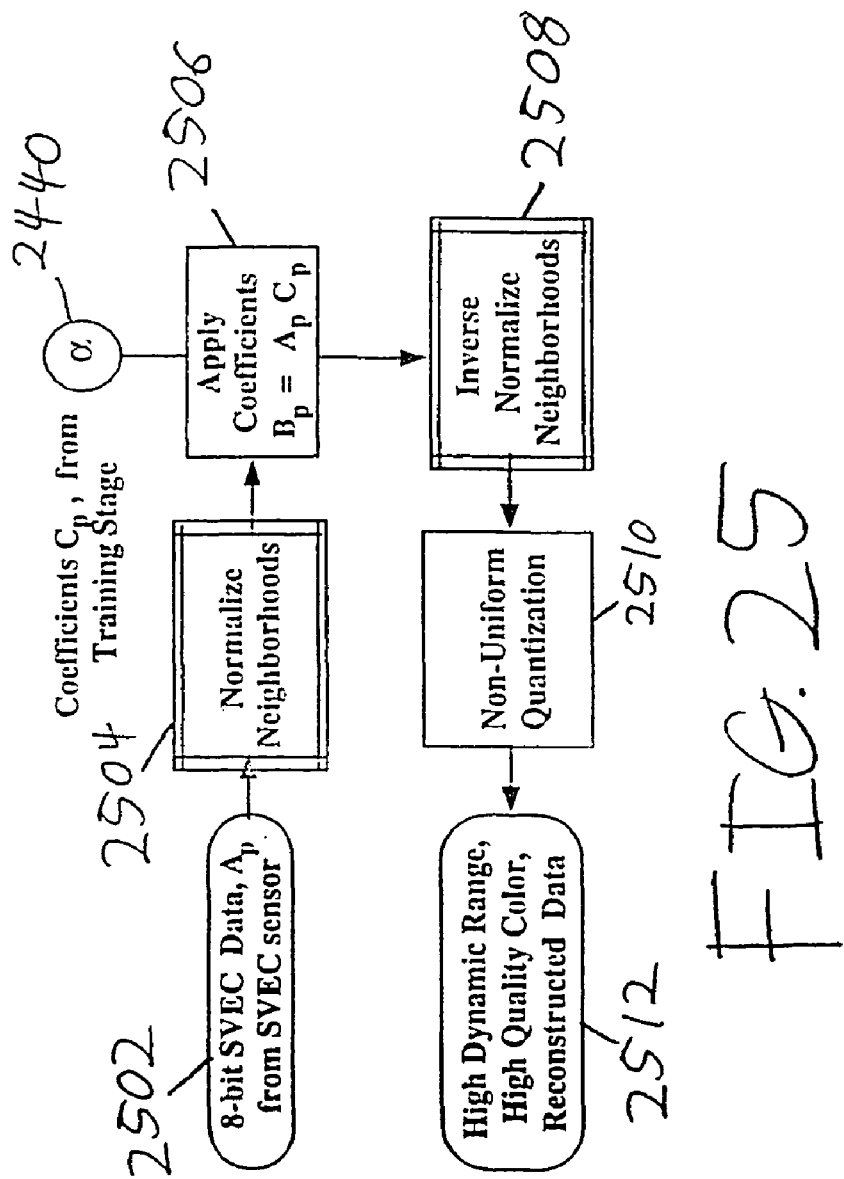
FIG. 25 is a flow diagram illustrating still another exemplary procedure for enhancing data resolution in accordance with the present invention.

In the reconstruction stage, an example of which is illustrated in FIG. 25, the algorithm applies the optimized polynomial coefficients to SVEC images 2502 captured using a low dynamic range (e.g., 8-bit), Bayer-mosaic SVEC sensor. Similarly to the training procedure, the reconstruction algorithm normalizes each neighborhood $A_p$ corresponding to each local pattern p in the SVEC image (step 2504). The coefficients $C_p$ (item 2440) are then applied to each of the normalized neighborhood patterns for each color channel, to thereby obtain $B_{pnorm} = A_{pnorm} C_p$ (step 2506). The algorithm then inverse normalizes $B_{pnorm}$ (step 2508). Because the SVEC pattern is based on non-uniform quantization of the scene radiance, the inverse normalized data are non-uniformly quantized according to the number of discrete exposures used in the SVEC detector mask (step 2510), to thereby generate a reconstructed high dynamic range color image 2512.

Figure 34:
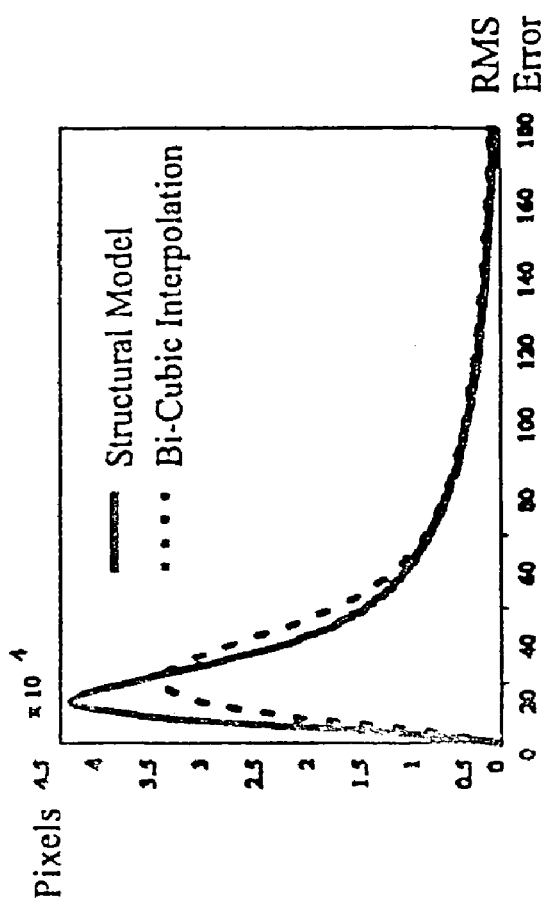
FIG. 34 is a graph illustrating the level of performance of an exemplary procedure for enhancing data resolution in accordance with the present invention.

An SVEC algorithm in accordance with the present invention has been tested using 10 high dynamic color (12-bits per color channel) training images taken under 4 different exposures. [confirm this] The training images represented a wide variety of natural scenes. For each pixel of each 12-bit training image, the algorithm deleted the information from 2 color channels, thereby converting each pixel to a single-color pixel. The result of this procedure was a set of 12-bit SVC images. The 12-bit SVC images corresponding to the 4 exposures of each scene were then combined according to the SVEC exposure pattern illustrated in FIG. 22. The resulting 12-bit SVEC images were then downgraded to produce 8-bit SVEC images, as illustrated in the flow chart of FIG. 24. The coefficients of the local polynomial mapping function (of order 3) were then computed using a weighted least squares technique. Next, 10 test images—different from the images using in training—were downgraded in order to generate exemplary 8-bit SVEC test images. The model, using coefficients generated by the training procedure, was then applied to the 8-bit SVEC test images according to the flow chart of FIG. 25. The histogram graph of FIG. 34 compares the results of the structural reconstruction algorithm of the present invention to results of a bi-cubic interpolation procedure. As illustrated by the graph, the structural model yielded more low-error pixels and fewer high-error pixels.

Figure 6F:
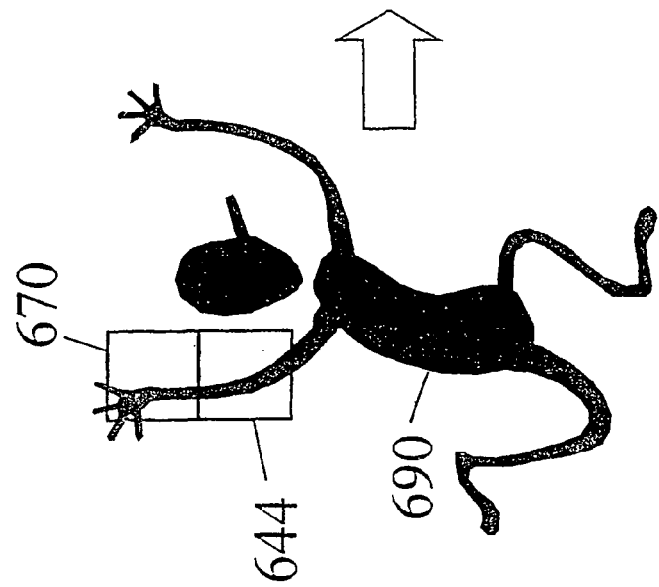
FIG. 6F is a diagram illustrating the use of an additional exemplary detector sensitivity pattern in accordance with the present invention.
Figure 6E:
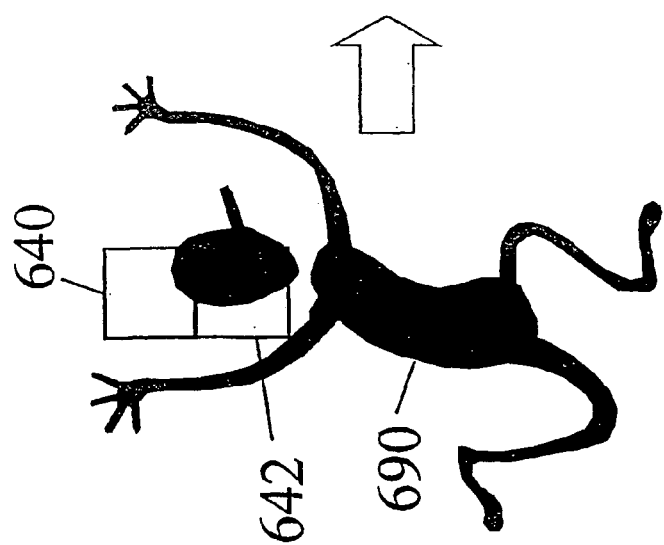
FIG. 6E is a diagram illustrating the use of another exemplary detector sensitivity pattern in accordance with the present invention.

Although the foregoing examples have emphasized measurement patterns arranged in two spatial dimensions (i.e., the vertical and horizontal dimensions), measurement patterns in accordance with the present invention need not be limited to spatial dimensions. In particular, for video applications, it can be desirable to utilize a measurement pattern which is locally inhomogeneous with respect to both space and time, as illustrated in FIGS. 6E and 6F. In FIG. 6E, a video frame is taken at a first time T1. The video frame includes measurements of light emanating from two regions 640 and 642 of the scene. The regions 640 and 642 are defined in terms of their locations in both space and time. In FIG. 6F, a second video frame is received at a second time T2, the second video frame including measurements of light received from two different locations 670 and 644 of the scene. It is to be noted that, in the example illustrated in FIGS. 6E and 6F, locations 640 and 670 have the same position in space but different positions in the time dimension. Similarly, locations 642 and 644 have the same positions in the spatial dimensions but different positions in the time dimension.

The measurements of locations 640, 642, and 644 can, for example, be made using the measurement pattern illustrated in FIG. 6A, which would be locally inhomogeneous in the vertical spatial dimension (as defined by pattern elements 602 and 604) and the time dimension (as defined by pattern elements 604 and 606).

An algorithm in accordance with the present invention can be used to enhance the time resolution of data such as the multiple-frame image data illustrated in FIGS. 6E and 6F. The spatial translation of the moving object 690 between consecutive images depends on the frequency at which the images are captured (i.e., the frame-rate). The structural models of the present invention can be used to upgrade (i.e., increase) the effective temporal frame rate of a video sequence. In effect, the models are used to introduce additional frames in between the originally captured ones. In order to perform the temporal resolution upgrade, the structural model predicts how much the brightness values in the image are expected to change between two frames.

Figure 28:
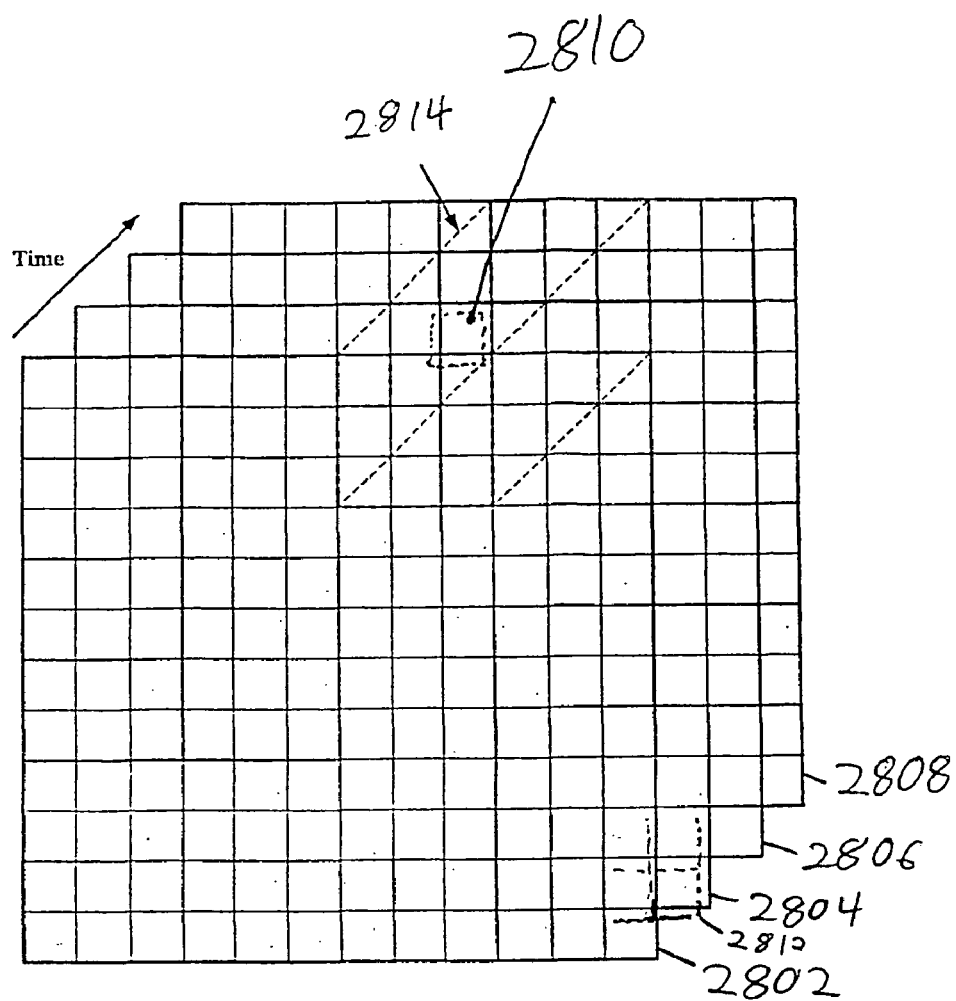
FIG. 28 is a diagram illustrating of an additional exemplary detector sensitivity pattern in accordance with the present invention.

Either real or synthetic high time resolution data can be used to optimize the model parameters. Such high time resolution data corresponds to a high frame rate video sequence of various types of objects in motion. The high resolution data is downgraded in temporal resolution in order to synthesize measured data. Local patterns in this case correspond to three-dimensional blocks of pixel values, in which each block has a range of spatial and temporal position. Referring to FIG. 28, for example, such a block 2814 can comprise four video frames 2802, 2804, 2806, and 2808 of a 3×3 spatial window (a total of 36 measured values), as illustrated in FIG. 28. A pixel value 2810 in an intermediate frame 2812 constitutes a high resolution image datum. The resolution enhancement algorithm expresses the high quality image data value 2810 as a polynomial function of the 36 measured values 2814. Such a structural model is used to predict a complete intermediate image frame. A set of structural models can therefore predict many intermediate frames, thereby increasing the temporal resolution of any captured video sequence.

Figure 26:
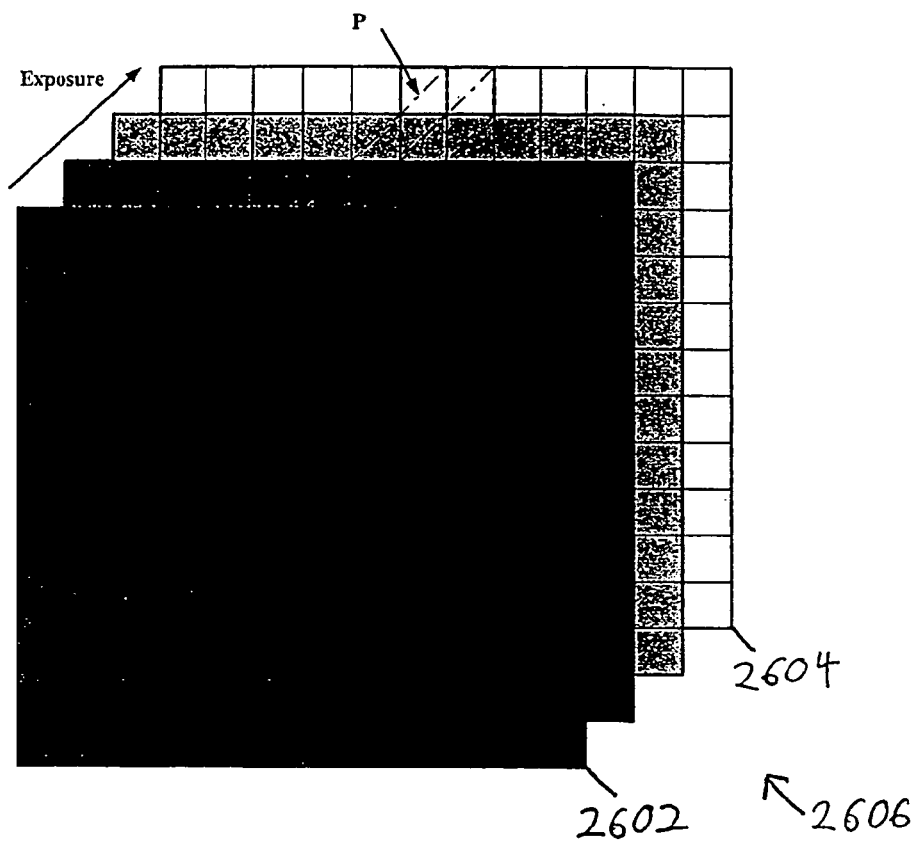
FIG. 26 is a diagram illustrating an additional exemplary detector sensitivity pattern in accordance with the present invention.

In addition, an algorithm in accordance with the present invention can also be used to enhance the resolution of image data in the form of a sequence of images captured using different exposures. Such a sequence can be captured using a number of techniques. For example, a user can simply change the aperture or exposure setting of a camera and capture a separate image using each setting. Furthermore, the camera itself can use multiple integration times in rapid succession to take a sequence of images. Either of these two methods yields a sequence of the type illustrated in FIG. 26. It is readily apparent that the illustrated sequence 2606 contains information sufficient to produce a high dynamic range image, because very bright scene regions will be captured without saturation in the least exposed image 2602, and very dark regions will be captured with good clarity in the most highly exposed image 2604. A polynomial model in accordance with the present invention can be used to compute a mapping from the set of brightness values corresponding to the different exposures of each pixel to a single high dynamic range value. Although the measured data will likely include saturation effects, and although the radiometric response function of the sensor used to capture the data may differ from the response function of the desired high quality image, the algorithm of the present invention can optimize a powerful polynomial model capable of generating a high dynamic range value for each pixel of the output image. Furthermore, the input and output images can also include color information. In the case of color images, the mapping can be done separately for each of the color channels. Alternatively, the mapping method can be used for the brightness data only, in which case the color of each pixel can be chosen from one of the unsaturated (and not too dark) measured values.

Although the foregoing discussion has emphasized brightness and color as important attributes of image pixels, light reflected from a scene also exhibits polarization states. The polarization state of the imaged light conveys useful information such as the presence of specular reflections (highlights) in the scene and the material properties of the reflecting surfaces. As discussed above, polarization filters having different linear polarization angles can be used to cover the pixels of an image detector. For example, the polarization filters can be added to all of the green color filters in a Bayer mosaic. The polarization state of a scene location can be computed using polarization data from adjacent pixels.

Figure 30:
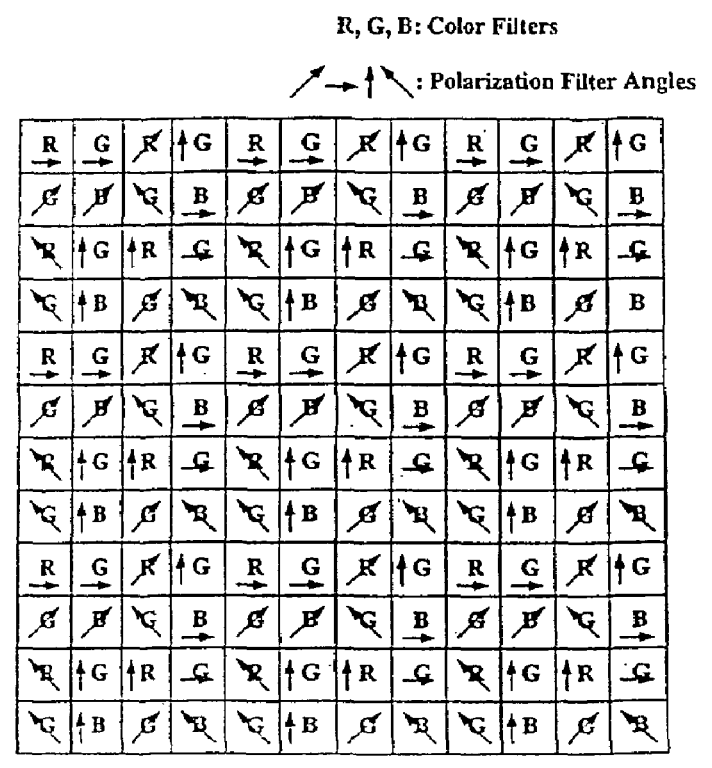

In accordance with the present invention, the resolution of polarization data can be enhanced by using structural models. FIG. 30 illustrates an exemplary arrangement of polarization and color filters on an image detector array. The acquired image contains both color and polarization information. An algorithm in accordance with the present invention trains structural models which use a small neighborhood of pixels to estimate high quality values of red, green, blue, and polarization state. As in the case of the SVEC algorithm discussed above, there are four different local patterns which arise in the polarization pattern illustrated in FIG. 30. Accordingly, four sets of structural models are estimated, each set including four model components, one component each for red, green, blue, and polarization angle data. The structural models incorporate the spatial correlation of polarization measurements and the spatial correlation of the color measurements. In addition, the models incorporate the correlations between the color channels and the polarization measurements.

If color is not of particular interest, a monochrome detector having different polarization filters can be used. In such a system, the structural models simply estimate the brightness value and polarization state at each point in the image.

Figure 7:
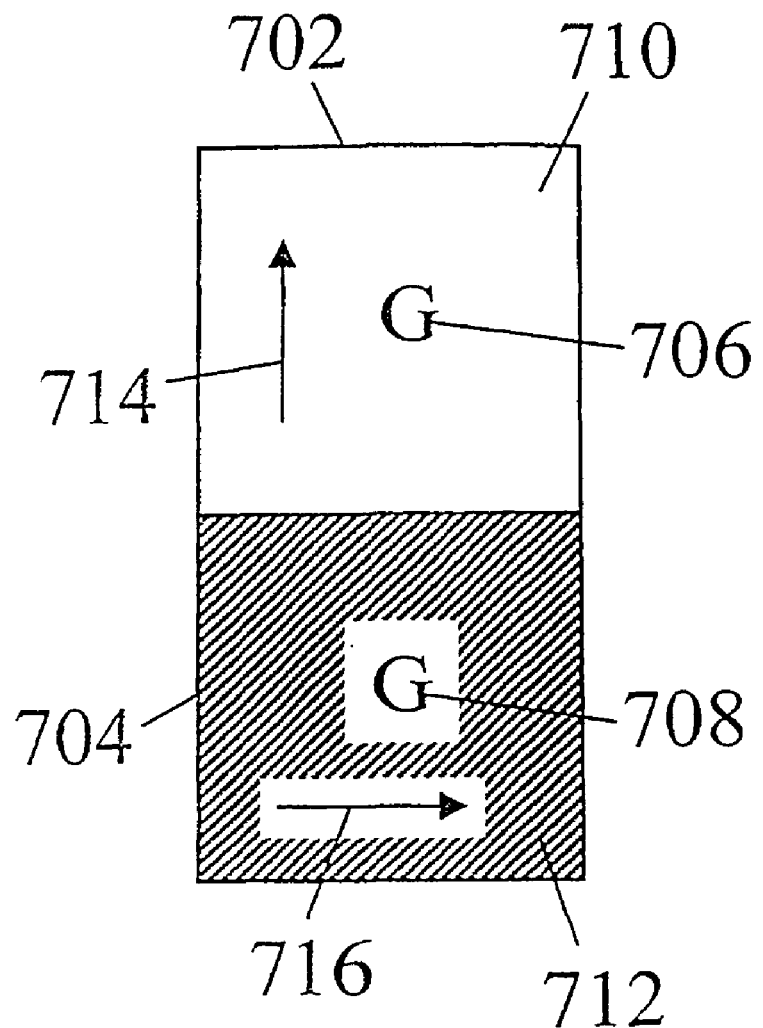
FIG. 7 is a diagram illustrating still another exemplary detector sensitivity pattern in accordance with the present invention.

The foregoing discussion has emphasized the use of measurement patterns comprising combinations of locally inhomogeneous patterns of color sensitivity characteristics and locally inhomogeneous patterns of intensity sensitivity characteristics. However, this discussion is not meant to imply any limitation on the number of types of measurement patterns which can be combined. For example, as illustrated in FIG. 7, it can be desirable to combine patterns of color sensitivity (characteristics 706 and 708), intensity sensitivity (characteristics 710 and 712), and polarization sensitivity (characteristics 714 and 716). Furthermore, although the example illustrated in FIG. 7 includes detector sets 702 and 704 each comprising a single detector, each of the detector sets 702 and 704 can also be formed from multiple detectors, similarly to the detector sets 602, 604 and 606 illustrated in FIG. 6B.

Figure 31:
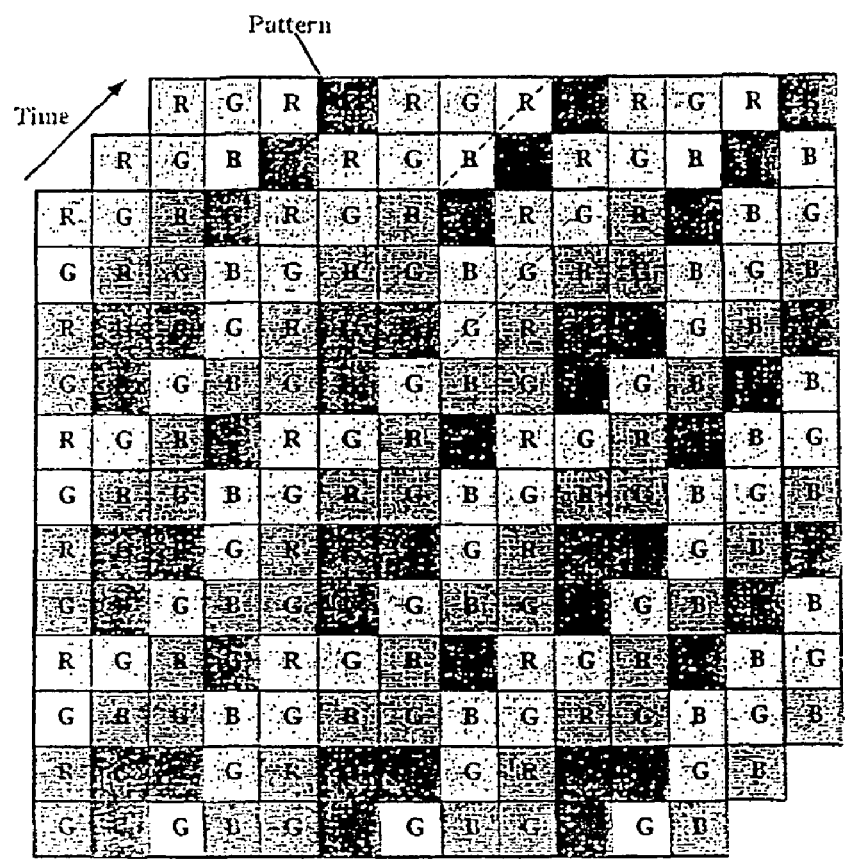
FIG. 31 is a diagram illustrating an additional exemplary detector sensitivity pattern in accordance with the present invention.

In the multiple-characteristic case, several structural models are used in order to include the various types of patterns that arise. Such a method is applicable to cases such as the exemplary pattern illustrated in FIG. 31, in which the image data includes spatial and temporal sampling of intensity and spectral attributes. Structural models are used to predict high quality image data in which the spatial, intensity, spectral, and/or temporal resolutions are enhanced.

Furthermore, it is to be understood that a reconstruction algorithm in accordance with the present invention is not limited to image data representing patterns of light within the visible spectrum. The techniques described herein are applicable to the imaging of any electromagnetic radiation or any other radiation, including, but not limited to, infra-red (IR) imaging, X-ray imaging, magnetic resonance (MR) imaging, synthetic aperture radar (SAR) imaging, particle-based imaging (e.g., electron microscopy), and acoustic (e.g., ultrasound) imaging.

Figure 27:
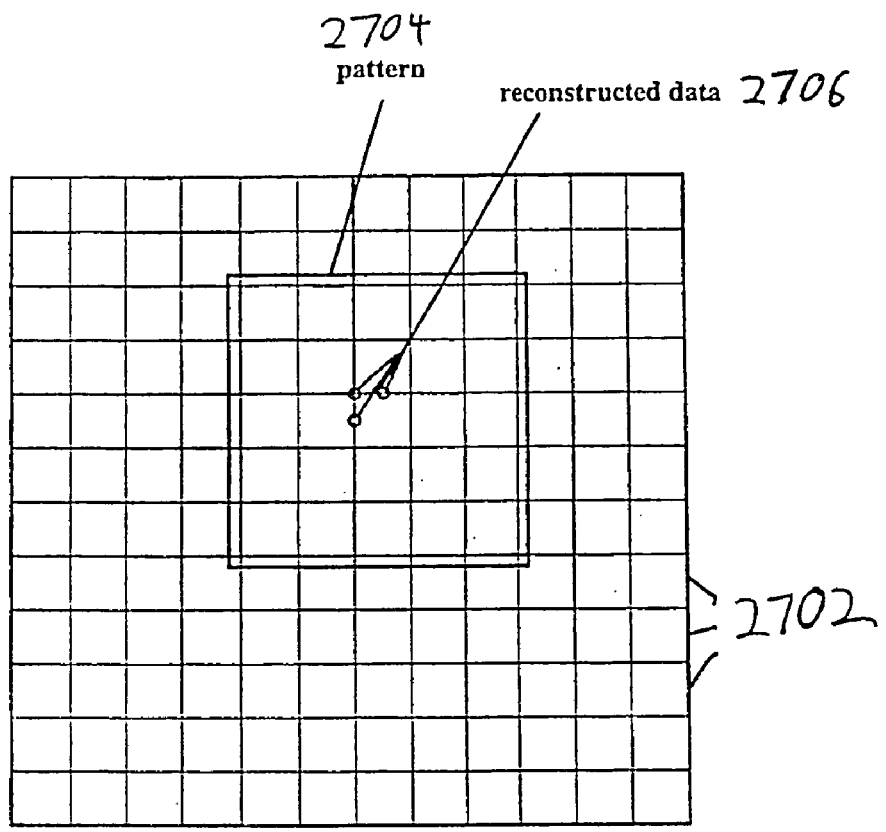
FIG. 27 is a diagram illustrating the reconstruction of data in accordance with the present invention.

A method in accordance with the invention can also be used to enhance the spatial resolution of an image. A captured image can be considered to be a low resolution version of a theoretical, higher quality image. Structural models can be used to map local neighborhoods of one or more low resolution images to a single high resolution value which can be considered to be a pixel of the aforementioned higher quality image. An example of such a technique is illustrated in FIG. 27. Each of the pixels 2702 of the image is represented by a measured brightness value. The algorithm performs a resolution upgrade in which a local neighborhood 2704 of measured pixel values is used to estimate the most likely values for new locations 2706 not lying on the pixel grid. The process is repeated over the entire image to generate an image having four times as many pixels as the original measured image. Information theory suggests that such a resolution upgrade cannot be performed using conventional techniques. However, the structural models of the present invention use extrinsic information to enable achievement of the additional resolution. In particular, the model coefficients incorporate knowledge of typical scenes, learned by the training procedure.

Similarly to the above-described examples, the spatial resolution enhancement algorithm uses a set of high resolution images to perform the training procedure. The training images are downgraded in resolution. The algorithm then optimizes the parameters of a polynomial structural model suitable for mapping local (e.g., 3×3 or 5×5) neighborhoods of measured values to the high quality data at one of the new locations. A separate structural model is computed for each of the new high quality values. In this example, three structural models are used, one for each of the new locations 2706. These models together enable a resolution upgrade of any given measured image. Moreover, although the above example involves the enhancement of the spatial resolution of a set of non-color brightness data, the technique can also be applied to data representing two or more color channels. For three color channels—typically R, G, and B—a total of 9 structural models are preferably used.

Figure 29:
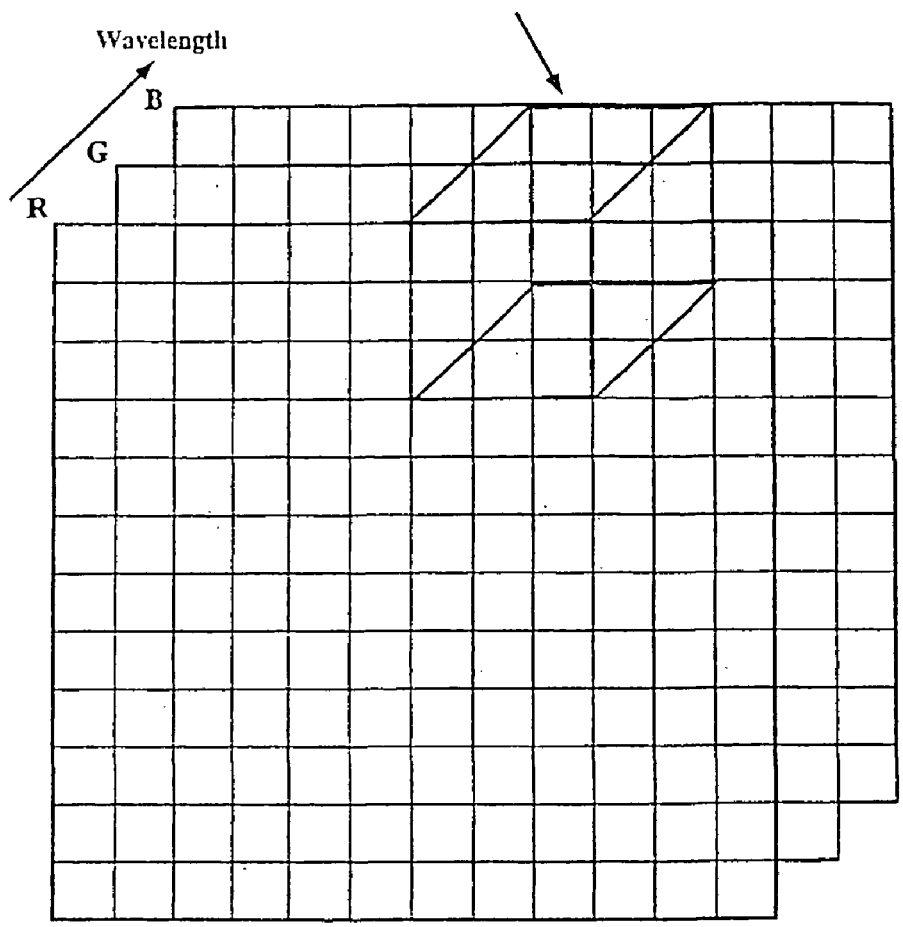
FIG. 29 is a diagram illustrating yet another exemplary sensitivity pattern in accordance with the present invention.

An algorithm in accordance with the present invention can also be used to enhance the spectral resolution of image data. In theory, a scene point can have any arbitrary spectral distribution function—i.e., any arbitrary reflectance as a function of wavelength. However, in practice, the natural and artificial physical processes that create object surfaces tend to cause the spectral distributions of surface reflectances to be smooth and well behaved. As a result, a small number of spectral samples—e.g., measurements made using narrow-band spectral filters—can be sufficient to accurately predict the complete spectral distributions of a large class of real world surfaces under a wide range of illumination conditions. FIG. 29 illustrates several images of an exemplary scene captured using different spectral filters. Such images can also be synthesized using high quality multi-spectral images. Real or synthesized images having relatively low spectral resolution are used to develop and optimize structural models capable of predicting the brightness values for wavelengths that lie between the measured (or synthesized) ones. Such a method enables the determination of estimates of the spectral distributions of scene points, based upon an image captured using a conventional (R-G-B) color camera. In a preferred embodiment, the neighborhood 2902 of measured data used for the reconstruction is defined in both spatial and spectral dimensions. Such an embodiment exploits the correlation between spectral distributions of neighboring scene points, to thereby provide higher quality reconstruction of the spectral distribution at each image location.

It will be appreciated by those skilled in the art that the methods of FIGS. 1–31 can be implemented on various standard computer platforms operating under the control of suitable software defined by FIGS. 4, 5, 9, 15, 16, 20, 21, 24, and 25. In some cases, dedicated computer hardware, such as a peripheral card in a conventional personal computer, can enhance the operational efficiency of the above methods.

Figure 32:
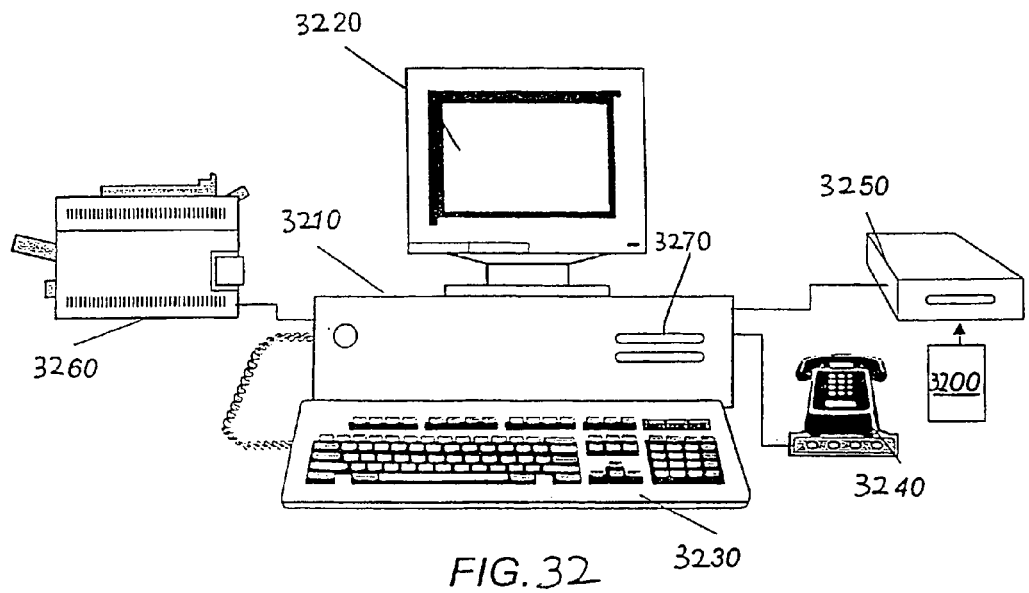
FIG. 32 is a block diagram illustrating a computer system for performing data resolution enhancement procedures in accordance with the present invention.
Figure 33:
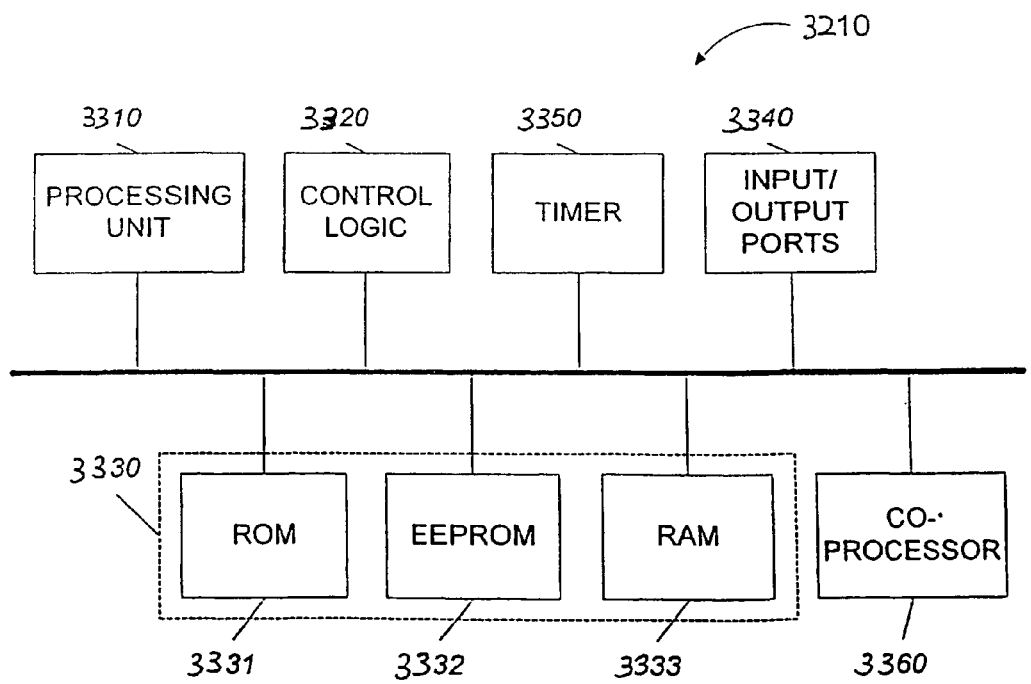
FIG. 33 is a block diagram of a processor for use in the computer system of FIG. 32.

FIGS. 32 and 33 illustrate typical computer hardware suitable for practicing the present invention. Referring to FIG. 32, the computer system includes a processing section 3210, a display 3220, a keyboard 3230, and a communications peripheral device 3240 such as a modem. The system can also include other input devices such as an optical scanner 3250 for scanning an image medium 3200. In addition, the system can include a printer 3260. The computer system typically includes one or more disk drives 3270 which can read and write to computer readable media such as magnetic media (i.e., diskettes), or optical media (e.g., CD-ROMS or DVDs), for storing data and application software. While not shown, other input devices, such as a digital pointer (e.g., a "mouse") and the like can also be included.

FIG. 33 is a functional block diagram which further illustrates the processing section 3210. The processing section 3210 generally includes a processing unit 3310, control logical 3320 and a memory unit 3330. Preferably, the processing section 3210 can also include a timer 3350 and input/output ports 3340. The processing section 3210 can also include a co-processor 3360, depending on the microprocessor used in the processing unit. Control logic 3320 provides, in conjunction with processing unit 3310, the control necessary to handle communications between memory unit 3350 and input/output ports 3340. Timer 3350 provides a timing reference signal for processing unit 3310 and control logic 3320. Co-processor 3360 provides an enhanced ability to perform complex computations in real time, such as those required by cryptographic algorithms.

Memory unit 3330 can include different types of memory, such as volatile and non-volatile memory and read-only and programmable memory. For example, as shown in FIG. 33, memory unit 3330 can include read-only memory (ROM) 3331, electrically erasable programmable read-only memory (EEPROM) 3332, and random-access memory (RAM) 3333. Different computer processors, memory configurations, data structures and the like can be used to practice the present invention, and the invention is not limited to a specific platform. For example, although the processing section 3210 is illustrated in FIGS. 32 and 33 as part of a computer system, the processing section 3210 and/or its components can be incorporated into an imager such as a digital video camera or a digital still-image camera.

Software defined by FIGS. 4, 5, 9, 15, 16, 20, 21, 24, and 25 can be written in a wide variety of programming languages, as will be appreciated by those skilled in the art. Exemplary software algorithms in accordance with the present invention have been written in the Matlab™ language, version 5.3.1. The computer source for exemplary SVEC, SVC, and SVE algorithms is provided in the Appendix attached hereto.

Although the present invention has been described in connection with specific exemplary embodiments, it should be understood that various changes, substitutions, and alterations can be made to the disclosed embodiments without departing from the spirit and scope of the invention as set forth in the appended claims.

We claim:

1. A method for learning a model for use in data resolution enhancement, comprising:
    an image processing step of processing a plurality of high quality images, the image processing step comprising:
        applying a simulated detector response function to each of the plurality of high quality images to thereby generate a set of training data,
        applying a locally inhomogeneous mosaic pattern function to the training data to thereby generate a set of reduced quality data,
        calculating a weighted normal matrix of the reduced quality data,
        adding the weighted normal matrix to a matrix sum,
        calculating a regression vector of the reduced quality data, and
        adding the regression vector to a vector sum;
    using the matrix sum to determine an accumulated normal matrix;
    using the vector sum to determine an accumulated regression vector; and
    solving a least squares equation to determine a coefficient matrix of a model for generating enhanced resolution data, the least squares equation comprising a first side and a second side, the first side comprising a product of the accumulated normal matrix and the coefficient matrix, the second side comprising the accumulated regression vector, and the coefficient matrix comprising coefficients of a polynomial function.

2. A method according to claim 1, wherein the image processing step further comprises downgrading the reduced quality data before the steps of calculating the weighted normal matrix and calculating the regression vector.

3. An apparatus for a learning model for use in data resolution enhancement, comprising:
    a first processor for processing a plurality of high quality images, comprising:
        a second processor for applying a simulated detector response function to each of the plurality of high quality images to thereby generate a set of training data,
        a third processor for applying a locally inhomogeneous mosaic pattern function to the training data to thereby generate a set of reduced quality data,
        a fourth processor for calculating a weighted normal matrix of the reduced quality data,
        a fifth processor for adding the weighted normal matrix to a matrix sum,
        a sixth processor for calculating a regression vector of the reduced quality data, and
        a seventh processor for adding the regression vector to a vector sum;
    an eighth processor for using the matrix sum to determine an accumulated normal matrix;
    a ninth processor for using the vector sum to determine an accumulated regression vector; and
    a tenth processor for solving a least squares equation to determine a coefficient matrix of a model for generating enhanced resolution data, the least squares equation comprising a first side and a second side, the first side comprising a product of the accumulated normal matrix and the coefficient matrix, the second side comprising the accumulated regression vector, and the coefficient matrix comprising coefficients of a polynomial function.

4. An apparatus according to claim 3, wherein the first processor further comprises an eleventh processor for downgrading the reduced quality data.

5. A computer-readable medium having a set of instructions operable to direct a processor to perform the steps of:
    an image processing step of processing a plurality of high quality images, the image processing step comprising:
        applying a simulated detector response function to each of the plurality of high quality images to thereby generate a set of training data,
        applying a locally inhomogeneous mosaic pattern function to the training data to thereby generate a set of reduced quality data,
        calculating a weighted normal matrix of the reduced quality data,
        adding the weighted normal matrix to a matrix sum,
        calculating a regression vector of the reduced quality data, and
        adding the regression rector to a rector sum;
    using the matrix sum to determine an accumulated normal matrix;
    using the vector sum to determine an accumulated regression vector; and
    solving a least squares equation to determine a coefficient matrix of a model for generating enhanced resolution data, the least squares equation comprising a first side and a second side, the first side comprising a product of the accumulated normal matrix and the coefficient matrix, the second side comprising the accumulated regression vector, and the coefficient matrix comprising coefficients of a polynomial function.

6. A computer-readable medium according to claim 5, wherein the image processing step further comprises downgrading the reduced quality data before the steps of calculating the weighted normal matrix and calculating the regression vector.

\* \* \* \* \*